(12) United States Patent
Savatsky et al.

(10) Patent No.: US 10,711,072 B2
(45) Date of Patent: Jul. 14, 2020

(54) METHODS AND SYSTEMS FOR OLEFIN POLYMERIZATION

(71) Applicant: Univation Technologies, LLC, Houston, TX (US)

(72) Inventors: Bruce J. Savatsky, Kingwood, TX (US); R. Eric Pequeno, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 125 days.

(21) Appl. No.: 15/566,301

(22) PCT Filed: Apr. 15, 2016

(86) PCT No.: PCT/US2016/027835
§ 371 (c)(1),
(2) Date: Oct. 13, 2017

(87) PCT Pub. No.: WO2016/168655
PCT Pub. Date: Oct. 20, 2016

(65) Prior Publication Data
US 2018/0100031 A1 Apr. 12, 2018

Related U.S. Application Data

(60) Provisional application No. 62/148,928, filed on Apr. 17, 2015.

(51) Int. Cl.
| | |
|---|---|
| *C08F 210/02* | (2006.01) |
| *C08F 2/01* | (2006.01) |
| *C08F 2/34* | (2006.01) |
| *B01J 8/00* | (2006.01) |
| *B01J 8/22* | (2006.01) |
| *B01J 8/24* | (2006.01) |
| *C08F 4/6592* | (2006.01) |

(52) U.S. Cl.
CPC ............... *C08F 2/01* (2013.01); *B01J 8/004* (2013.01); *B01J 8/224* (2013.01); *B01J 8/24* (2013.01); *C08F 2/34* (2013.01); *C08F 4/65922* (2013.01); *C08F 210/02* (2013.01); *C08F 2400/02* (2013.01); *C08L 2314/02* (2013.01); *C08L 2314/06* (2013.01)

(58) Field of Classification Search
CPC ... C08F 2/01; C08F 2/34; C08F 210/02; B01J 8/24; B01J 8/004; B01J 8/224
See application file for complete search history.

(56) References Cited

U.S. PATENT DOCUMENTS

| | | | |
|---|---|---|---|
| 6,075,101 A | 6/2000 | Lynn et al. | |
| 9,221,937 B2 * | 12/2015 | Savatsky | ........... C08F 2/01 |
| 2011/0040048 A1 | 2/2011 | Terry et al. | |
| 2015/0183905 A1 | 7/2015 | Savatsky et al. | |

FOREIGN PATENT DOCUMENTS

| | | | |
|---|---|---|---|
| CN | 104190330 | | 12/2014 |
| WO | WO 20214/022006 | * | 2/2014 |

OTHER PUBLICATIONS

International Search Report & Written Opinion for related PCT Application PCT/US2016/027835, dated Jul. 18, 2016 (11 pgs).
International Preliminary Report on Patentability for related PCT Application PCT/US2016/027835, dated Oct. 26, 2017 (8 pgs).

* cited by examiner

*Primary Examiner* — Peter D. Mulcahy
(74) *Attorney, Agent, or Firm* — Brooks, Cameron & Huebsch, PLLC

(57) ABSTRACT

Methods and systems for olefin polymerization are provided. The method for olefin polymerization can include flowing a catalyst through an injection nozzle and into a fluidized bed disposed within a reactor. The method can also include flowing a feed comprising one or more monomers, one or more inert fluids, or a combination thereof through the injection nozzle and into the fluidized bed. The feed can be at a temperature greater than ambient temperature. The method can also include contacting one or more olefins with the catalyst within the fluidized bed at conditions sufficient to produce a polyolefin.

20 Claims, 3 Drawing Sheets

METHODS AND SYSTEMS FOR OLEFIN POLYMERIZATION

This application is a National Stage Application under 35 U.S.C. § 371 of International Application Number PCT/US2016/027835, filed Apr. 15, 2016 and published as WO 2016/168655 on Oct. 20, 2016, which claims the benefit of U.S. Provisional Application 62/148,928, filed Apr. 17, 2015, the entire contents of which are incorporated herein by reference in its entirety.

BACKGROUND

In gas phase polymerization processes, a gaseous stream containing one or more monomers is passed through a fluidized bed under reactive conditions in the presence of a catalyst. A polymer product is withdrawn from the reactor, while fresh monomer is introduced to the reactor to react with the catalyst and replace the removed polymerized product. A gas phase fluidized bed reactor can include a reaction zone and a so-called velocity reduction zone. The reaction zone can include a bed of growing polymer particles, formed polymer particles, and a minor amount of catalyst particles fluidized by the continuous flow of gaseous monomer and diluent to remove heat of polymerization through the reaction zone. A portion of the gases within the reactor can be re-circulated via a cycle gas stream. This cycle gas stream can be passed through a heat exchanger, where at least a portion of the heat of polymerization can be removed, and then compressed in a compressor and returned to the reaction zone. Ongoing efforts have been directed to methods of increasing the control of the product morphology of the resin resulting from the polymerization process. Production of polyolefins in fluidized bed processes may suffer if the product particle size distribution has too many small particles, i.e., fines. Fines can buildup in the heat exchanger tubes or other areas of the reactor system, and may contribute to causing a shutdown. Likewise, high amounts of larger particles increase the likelihood of entrainment from the reactor and plugging of the main cycle gas cooler tubes or of the distributor plate. Additionally, as the amount of larger particles and randomly shaped particles increases there could be a tendency for disruptions in the downstream handling of the resin.

There is a need, therefore, for improved methods for controlling the product morphology of polyolefins produced by various catalyst compositions used in such processes.

SUMMARY

The subject matter of this application relates, in part, to the discovery that polymer morphology can be controlled by controlling the feed temperature and/or the feed flow rate through a feed injection nozzle.

Thus, methods and systems for controlling polymer morphology in olefin polymerization are provided. In one aspect, the methods for controlling polymer morphology in olefin polymerization, comprise: flowing a catalyst through a first concentric flow path of the injection nozzle having two or more concentric flow paths and into a fluidized bed disposed within a reactor; flowing a feed comprising one or more monomers, one or more inert fluids, or a combination thereof through a second concentric flow path of the injection nozzle and into the fluidized bed, controlling of one or more of: i) the temperature of the second concentric flow path or ii) the flow rate of the feed through the second concentric flow path; and contacting one or more olefins with the catalyst within the fluidized bed at conditions sufficient to produce a polyolefin.

In another aspect, the methods for controlling polymer morphology in olefin polymerization comprise: flowing a catalyst through a first concentric flow path of the injection nozzle having two or more concentric flow paths and into a fluidized bed disposed within a reactor; flowing a first amount of feed comprising one or more olefins, one or more inert fluids, or a combination thereof through a second concentric flow path of the injection nozzle at first flow rate and first temperature and into the fluidized bed; and contacting the first amount of feed with the catalyst within the fluidized bed at conditions sufficient to produce a polyolefin having a first size distribution; flowing a second amount of the catalyst through the first concentric flow path and into the fluidized bed; flowing a second amount of feed comprising one or more olefins, one or more inert fluids, or a combination thereof through the second concentric flow path at a second flow rate and a second temperature and into the fluidized bed; and contacting the second amount of feed with the catalyst within the fluidized bed at conditions sufficient to produce a polyolefin having a second size distribution, wherein the first size distribution is different from the second size distribution, wherein the first temperature is different from the second temperature and/or the first flow rate is different from the second flow rate.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

For the purposes of subject matter described herein and the claims thereto, the new numbering scheme for the Periodic Table Groups is used as described in Chemical and Engineering News, 63(5), pg. 27 (1985). Therefore, a "Group 4 metal" is an element from Group 4 of the Periodic Table, e.g., Ti, Zr, or Hf.

As used herein the term "fines" refers to polymer particles having a size and shape that allow passage through a #120 (US) mesh sieve.

The terms "particle morphology," "particle size distribution," and the like are used interchangeably. Particle size distribution are different where at least one slice of the distribution over a range of a selected size ±0.1 mm differs from a comparison slice by ≥1.0 wt. %, e.g., ≥2.0 wt. %, ≥3.0 wt. %, ≥4.0 wt. %, ≥5.0 wt. %, ≥7.5 wt. %, ≥10.0 wt. % or more.

Figure 1:
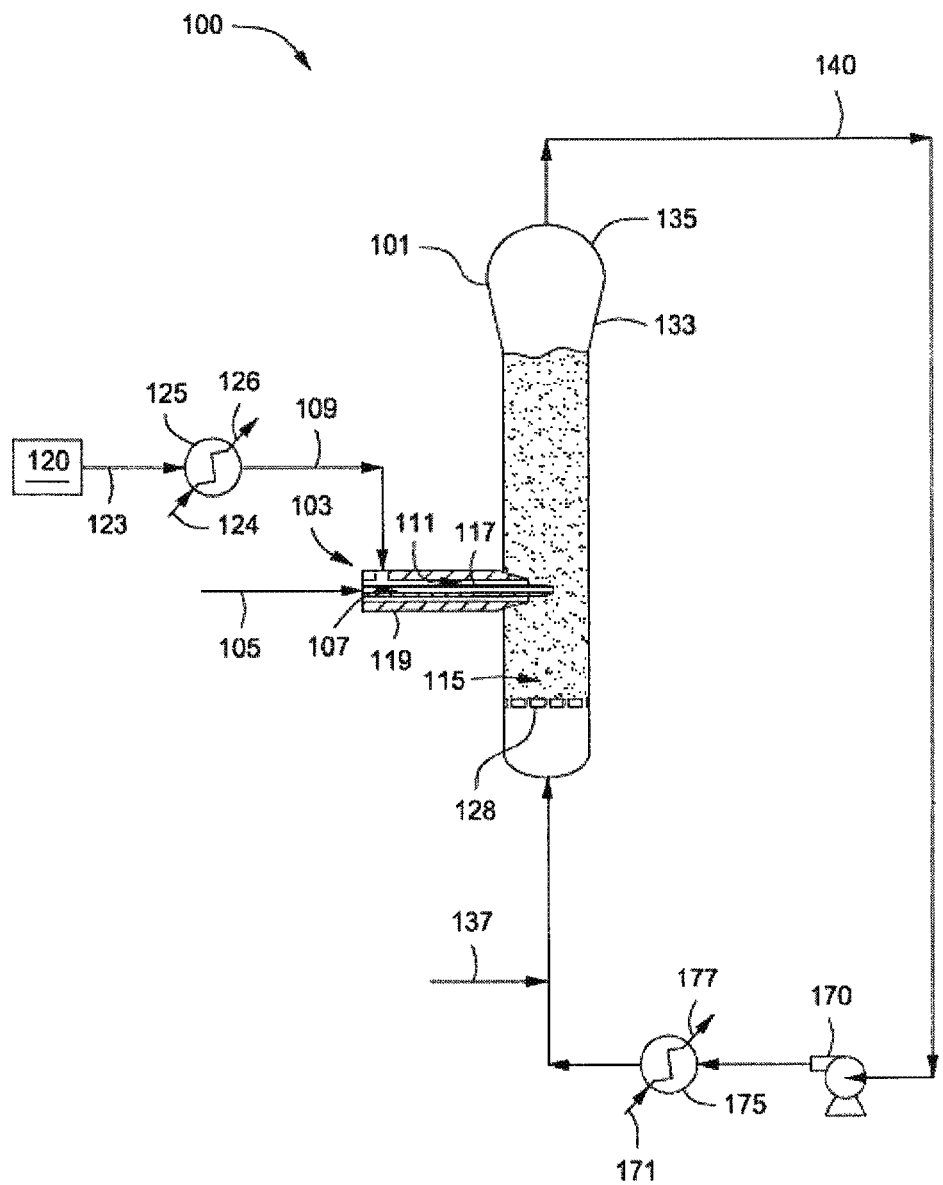
FIG. 1 depicts an illustrative gas phase polymerization system for making polymers.

FIG. 1 depicts an illustrative gas phase polymerization system 100 for making one or more polymers. The polymerization system 100 can include a reactor 101 in fluid communication with one or more catalyst injection nozzles or tubes 103, one or more discharge tanks 155, compressors 170, and heat exchangers 175. One or more catalysts or catalyst systems via line 105 and one or feeds via line 109 can be introduced to a fluidized bed 115 disposed within the reactor 101 via the nozzle 103. The fluidized bed 115 has the general appearance of a dense mass of individually moving particles created by the percolation of a cycle or "recycle" gas flowing therethrough. The recycle gas can be recovered from and recycled to the reactor 101 via one or more recycle lines 140.

The nozzle 103 can convey, transport, direct, inject, disperse, distribute, or otherwise introduce the catalyst in line 105 into the fluidized bed 115 via one or more first flow paths 107 formed through the nozzle 103. For purposes of this disclosure, the terms "catalyst" and "catalyst system" are intended to be interchangeable and include any element and/or compound that is capable of catalyzing the polymerization or oligomerization of one or more olefins. The nozzle 103 can also convey, transport, direct, inject, or otherwise introduce the feed in line 109 into the fluidized bed 115 via one or more second flow paths 111 formed through the nozzle 103. The feed in line 109 can be or include one or more monomers, one or more inert gases, one or more inert liquids, or any combination thereof.

The first flow path 107 can be at least partially surrounded by the second flow path 111. For example, the first flow path 107 can be a bore or other passageway formed through a first conduit or "catalyst conduit" 117. The first conduit 117 can be at least partially disposed within a second conduit or "support conduit" 119. The second flow path 111 can be an annulus or other passageway defined between the outer surface of the catalyst conduit 117 and the inner surface of the support conduit 119. The first conduit 117 and the second conduit 119 can be concentric. The nozzle 103 can also be referred to as a "tube in a support tube nozzle."

The feed in line 109 can be provided via line 123 from one or more sources 120. For example, the source 120 can be a plenum, header, tank, pipeline, or the like. The polymerization system 100 can also include one or more heat exchangers 125 that can heat the feed in line 123 to provide the feed in line 109 above ambient temperature. The feed via line 123 and a heat transfer medium via line 124 can be introduced to the heat exchanger 125 to provide the feed in line 109 at a temperature greater than ambient temperature and a cooled heat transfer medium via line 126. Although not shown, the feed in line 123 at a temperature at or below ambient can be introduced directly to the nozzle 103 and the nozzle 103 can be configured or adapted to heat the feed within the nozzle 103. For example, the support tube 119 can include one or more heating elements, heating jackets, or the like that can transfer sufficient heat to the feed as the feed flows through the second flow path 111 and into the fluidized bed 115.

It has been surprisingly and unexpectedly discovered that hotter feeds from line 109 can significantly change the size distribution of the polymer particles produced by the process. For example, by increasing the temperature of the feed in the feed line 123 from first temperature to a second temperature, the percent of polymer product fines can be increased within the reactor 101 by ≥ about 1%, e.g., ≥ about 3%, ≥ about 5%, ≥ about 10%, ≥ about 20%, ≥ about 30%, ≥ about 40%, ≥ about 50%, ≥ about 75%, ≥ about 100%, ≥ about 125, ≥ about 150, or ≥ about 175%. Additionally or alternatively, the increase in the amount of fines produced at the second temperature relative to the first temperature may be ≤ about 200%, e.g., ≤ about 175%, ≤ about 150%, ≤ about 125%, ≤ about 100%, ≤ about 75%, ≤ about 50%, ≤ about 40%, ≤ about 30%, ≤ about 20%, ≤ about 10%, ≤ about 5%, or ≤ about 3%. Suitable ranges may be formed by any of the above enumerated values. The percent increase or decrease is based on the weight % of fines produced in the process at the first temperature.

Conversely, where the polymerization is producing an undesirably high level of fines, the amount of fines can be reduced by reducing the temperature of the feed flowing through line 123 to reactor 101. For example, the amount of fines produced in the polymerization system 100 at a second temperature may be about 2% less, e.g., about 5% less, about 10% less, about 15% less, about 20% less, about 25% less, about 30% less, about 35% less, about 40% less, about 45% less, about 50% less, about 55% less, about 60% less, about 65% less, or about 75% less, than the amount of fines produced at a first temperature, with suitable ranges being formed from any two of the above-enumerated values. The percent reduction is based on the weight % of fines produced in the process at the first temperature. Often in gas phase polymerization processes, production of fines is undesirable. Fines can accumulate in poorly circulated or poorly cooled regions of the reactor, and cause undesirable melting and fusing of polymer into sheets or chunks along the reactor walls. This can lead to a complete reactor shut down. If the fines are transferred from the reactor into the cycle gas stream, they can cause problems with fouling and plugging within the heat exchanger and other parts of the cycle gas loop. Various methods are known in the art of controlling fines, but they often require additional equipment and/or add complexity to the process. Thus, it is advantageous to have simple methods of controlling the amount of fines produced, such as are disclosed herein.

The temperature of the feed in line 109 can be ≥ about −35° C., e.g., ≥ about −20° C., ≥ about −10° C., ≥ about 0° C., ≥ about 5° C., ≥ about 15° C., ≥ about 25° C., ≥ about 35° C., ≥ about 45° C., ≥ about 55° C., ≥ about 70° C., ≥ about 80° C., ≥ about 90° C., ≥ about 100° C. Additionally or alternatively, the temperature of the feed in line 109 may be ≤ about 110° C., e.g., ≤ about 100° C., ≤ about 90° C., ≤ about 80° C., ≤ about 70° C., ≤ about 55° C., ≤ about 45° C., ≤ about 35° C., ≤ about 25° C., ≤ about 15° C., ≤ about 5° C., ≤ about 0° C., ≤ about −5° C., ≤ about −10° C., ≤ about −20° C., with suitable ranges comprising the combination of any two values. Exemplary ranges of the temperature of the feed in line 109 include temperatures of about 50° C. to about 110° C., about 70° C. to about 100° C., about 85° C. to about 105° C., about 80° C. to about 97° C., about 90° C. to about 103° C., or about 93° C. to about 110° C. In another example, the temperature of the feed in line 109 can exceed the ambient temperature the polymerization system 100 is operating in by at least 5° C., at least 10° C., at least 15° C., at least 20° C., at least 25° C., at least 30° C., at least 35° C., at least 40° C., at least 50° C., at least 55° C., at least 60° C., at least 65° C., at least 70° C., at least 75° C., or at least 80° C.

Thus, the first temperature may be ≥ about −35° C., e.g., ≥ about −20° C., ≥ about −10° C., ≥ about 0° C., ≥ about 5° C., ≥ about 15° C., ≥ about 25° C., e.g., ≥ about 35° C., ≥ about 45° C., ≥ about 55° C., ≥ 70° C., ≥ about 80° C., ≥ about 90° C., or ≥ about 100° C. Additionally or alternatively, the first temperature may be ≤ about 110° C., e.g., ≤ about 100° C., ≤ about 90° C., ≤ about 80° C., ≤ about 70° C., ≤ about 55° C., ≤ about 45° C., ≤ about 35° C., ≤ about 25° C., ≤ about 15° C., ≤ about 5° C., ≤ about 0° C., ≤ about −10° C., ≤ about −20° C., with suitable ranges of the first temperature comprising combinations of any two above-enumerated values. Likewise the second temperature may be ≥ about −35° C., e.g., ≥ about −20° C., ≥ about −10° C., ≥ about 0° C., ≥ about −5° C., ≥ about 15° C., ≥ about 25° C., ≥ about 35° C., ≥ about 45° C., ≥ about 55° C., ≥ 70° C., ≥ about 80° C., ≥ about 90° C., or ≥ about 100° C. Additionally or alternatively, the first temperature may be ≤ about 110° C., e.g., ≤ about 100° C., ≤ about 90° C., ≤ about 80° C., ≤ about 70° C., ≤ about 55° C., ≤ about 45° C., or ≤ about 35° C., ≤ about 25° C., ≤ about 15° C., ≤ about 5° C., ≤ about 0° C., ≤ about −10° C., ≤ about −20° C., with suitable ranges of the second temperature comprising combinations of any two above-enumerated values.

The temperature of the feed in line 109 can also be referenced with respect to a temperature of the fluidized bed 115 within the reactor 101. Depending on the particular polymer product being produced within the reactor 101, the temperature of the fluidized bed 115 can widely vary. For example, the temperature of the fluidized bed 115 can range from about −10° C. to about 140° C., about 50° C. to about 130° C., about 60° C. to about 120° C., about 70° C. to about 110° C., or about 70° C. to about 105° C. In some embodiments, the temperature of the feed in line 109 can be equal to or greater than a temperature that is not less than 50° C., not less than 45° C., not less than 40° C., not less than 35° C., not less than 30° C., not less than 25° C., not less than 20° C., not less than 15° C., not less than 10° C., not less than 5° C., or not less than 1° C. below the temperature of the fluidized bed 115. In another example, the temperature of the feed in line 109 can be within about 140° C., e.g., within about 120° C., within about 100° C., within about 75° C., within about 50° C., within about 45° C., within about 40° C., within about 35° C., within about 30° C., within about 25° C., within about 20° C., within about 15° C., within about 10° C., within about 5° C., or within about 1° C. of the temperature of the fluidized bed 115. In another example, the temperature of the feed in line 109 can be equal to or greater than the temperature of the fluidized bed 115. For example, the temperature of the feed in line 109 can exceed the temperature of the fluidized bed 115 by about 1° C. or more, about 3° C. or more, about 5° C. or more, about 7° C. or more, about 10° C. or more, about 13° C. or more, about 15° C. or more, about 17° C. or more, about 20° C. or more, about 25° C. or more, about 30° C. or more, about 35° C. or more, about 40° C., about 45° C., about 50° C. or more, about 75° C. or more, about 100° C. or more, about 120° C. or more, or about 140° C. or more. For example, the temperature of the fluidized bed can exceed the temperature of the feed in line 109 by about 1° C. or more, about 3° C. or more, about 5° C. or more, about 7° C. or more, about 10° C. or more, about 13° C. or more, about 15° C. or more, about 17° C. or more, about 20° C. or more, about 25° C. or more, about 30° C. or more, about 35° C. or more, about 40° C., about 45° C., about 50° C. or more, about 75° C. or more, about 100° C. or more, about 120° C. or more, or about 135° C. or more.

While the temperature of the feed may affect the relative amount of fines produced in the process, the amount of desirably sized particles (i.e., particles having a size +120/−10 mesh) produced the process may be relatively unaffected. For example, the relative amount of desirably sized particles produced in the process at the second temperature may be within about 1 wt. %, 2 wt. %, 3 wt. %, 4 wt. %, 5 wt. %, 6 wt. %, 7 wt. %, 8 wt. %, 9 wt. %, or 10 wt. % of the amount of desirably sized particles formed in the process at the first temperature. Ranges of the relative amount of desirably sized particles expressly disclosed herein comprise any pair of the above-enumerated values, e.g., with about 1 to about 10 wt. %, within about 2 to about 9 wt. %, within about 3 to about 7 wt. %, within about 4 to about 6 wt. %, etc.

Additionally or alternatively, the amount of large particles (i.e., particles retained by a #10 mesh (US) sieve) may be within an acceptable range at the first temperature as well as at the second temperature. For example the amount of +10 mesh (US) particles at the first temperature may be typically ≤ about 5 wt. %, e.g., ≤ about 2 wt. %, ≤ about 1 wt. %, ≤ about 0.5 wt. %, ≤ about 0.25 wt. %. Additionally or alternatively, the amount of +10 mesh (US) particles at the first temperature may be ≥ about 0.1 wt. %, e.g., ≥ about 0.25 wt. %, ≥ about 0.5 wt. %, ≥ about 1 wt. %, or ≥ about 2 wt. %. The amount of particles retained by a #10 mesh (US) sieve at the second temperature may be ≤ about 5 wt. %, e.g., ≤ about 2 wt. %, ≤ about 1 wt. %, ≤ about 0.5 wt. %, ≤ about 0.25 wt. %. Additionally or alternatively, the amount of +10 mesh (US) particles at the second temperature may be ≥ about 0.1 wt. %, e.g., ≥ about 0.25 wt. %, ≥ about 0.5 wt. %, ≥ about 1 wt. %, or ≥ about 2 wt. %. Ranges of the first and second temperatures expressly disclosed comprise any combination of the above-enumerated upper and lower values, and the amount is based on the total wt. % of particles produced.

In addition to affecting the product particle size distribution, the control of the feed temperature in line 123 can also serve one or more additional functions. For example, controlling the temperature of the feed introduced via line 123 to the nozzle 103 can facilitate maintaining the catalyst injection area clean. Said another way, controlling the temperature of the feed via line 123 can prevent or reduce catalyst accumulation and/or fouling on or about the nozzle 103. It can also help to convey, transport, direct, inject, disperse, distribute, or otherwise introduce the catalyst via the first flow path 107 into the fluidized bed 115 in such a way that polymer agglomerates in the reactor 101 are reduced or eliminated.

Additionally or alternatively, the particle size distribution may be affected by the flow rate of the feed through line 123. Thus, by changing the flow rate (e.g., increasing) of the feed in the feed line 123 from first flow rate to a second flow rate, the percent of polymer product fines can be increased within the reactor 101 by ≥ about 1%, e.g., ≥ about 3%, ≥ about 5%, ≥ about 10%, ≥ about 20%, ≥ about 30%, ≥ about 40%, ≥ about 50%, ≥ about 75%, ≥ about 100%, ≥ about 125, ≥ about 150, or ≥ about 175%. Additionally or alternatively, the increase in the amount of fines produced at the second flow rate relative to the first flow rate may be ≤ about 200%, e.g., ≤ about 175%, ≤ about 150%, ≤ about 125%, ≤ about 100%, ≤ about 75%, ≤ about 50%, ≤ about 40%, ≤ about 30%, ≤ about 20%, ≤ about 10%, ≤ about 5%, or ≤ about 3%. Suitable ranges may be formed by any of the above enumerated values. The percent increase is based on the weight % of fines produced in the process at the first flow rate.

Conversely, where the polymerization is producing an undesirably high level of fines, the amount of fines can be reduced by changing the flow rate (e.g., decreasing) of the feed flowing through line 123 to reactor 101. For example, the amount of fines produced in the polymerization system 100 at a second flow rate may be about 2% less, e.g., about 5% less, about 10% less, about 15% less, about 20% less, about 25% less, about 30% less, about 35% less, about 40% less, about 45% less, about 50% less, about 55% less, about 60% less, about 65% less, or about 75% less, than the amount of fines produced at a first flow rate, with suitable ranges being formed from any two if the above-enumerated values. The percent reduction is based on the weight % of fines produced in the process at the first flow rate.

As with the temperature of the feed, the flow rate of the feed may be changed without significantly changing the amount of desirably sized particles (i.e., particles having a size +120/−10 mesh) in the reactor. For example, the relative amount of desirably sized particles at the second flow rate may be within about 1 wt. %, 2 wt. %, 3 wt. %, 4 wt. %, 5 wt. %, 6 wt. %, 7 wt. %, 8 wt. %, 9 wt. %, or 10 wt. % of the amount of desirably sized particles formed in the reactor at the first flow rate. Ranges of the relative amount of desirably sized particles expressly disclosed herein comprise any pair of the above-enumerated values, e.g., with about 1 to about 10 wt. %, within about 2 to about 9 wt. %, within about 3 to about 7 wt. %, within about 4 to about 6 wt. %, etc.

Additionally or alternatively, the amount of large particles (i.e., particles retained by a #10 mesh (US) sieve) may be within an acceptable range at the first flow rate as well as at the second flow rate. For example the amount of +10 mesh (US) particles at the first flow rate may be ≤ about 5 wt. %, e.g., ≤ about 2 wt. %, ≤ about 1 wt. %, ≤ about 0.5 wt. %, ≤ about 0.25 wt. %. Additionally or alternatively, the amount of +10 mesh (US) particles at the first flow rate may be ≥ about 0.1 wt. %, e.g., ≥ about 0.25 wt. %, ≥ about 0.5 wt. %, ≥ about 1 wt. %, or ≥ about 2 wt. %. The amount of particles retained by a #10 mesh (US) sieve at the second flow rate may be ≤ about 5 wt. %, e.g., ≤ about 2 wt. %, ≤ about 1 wt. %, ≤ about 0.5 wt. %, ≤ about 0.25 wt. %. Additionally or alternatively, the amount of +10 mesh (US) particles at the second flow rate may be ≥ about 0.1 wt. %, e.g., ≥ about 0.25 wt. %, ≥ about 0.5 wt. %, ≥ about 1 wt. %, or ≥ about 2 wt. %. Ranges of the first and second flow rates expressly disclosed comprise any combination of the above-enumerated upper and lower values.

The flow rate of the feed through line 109 may be ≥ about 1000 lb/hr (455 kg/hr), e.g., ≥ about 1500 lb/hr (680 kg/hr), ≥ about 2000 lb/hr (907 kg/hr), ≥ about 2500 lb/hr (1134 kg/hr), ≥ about 3000 lb/hr (1361 kg/hr), ≥ about 3500 lb/hr (1588 kg/hr), ≥ about 4000 lb/hr (1814 kg/hr), or ≥ about 4500 lb/hr (2041 kg/hr). The flow rate of the feed through line 109 may, additionally or alternatively, be ≤ about 5000 lb/hr (2268 kg/hr), e.g., ≤ about 4500 lb/hr (2041 kg/hr), ≤ about 4000 lb/hr (1814 kg/hr), ≤ about 3500 lb/hr (1588 kg/hr), ≤ about 3000 lb/hr (1361 kg/hr), ≤ about 2500 lb/hr (1134 kg/hr), ≤ about 2000 lb/hr (907 kg/hr), or ≤ about 1500 lb/hr (680 kg/hr). Ranges of the flow of the feed through line 109 comprise ranges formed by any of the combination of the above-enumerated values are expressly disclosed.

Combinations of temperatures and flow rates of the feed in line 109 expressly include any combinations of temperatures and flow rates herein described.

The feed in lines 123, 109 can be or include one or more olefin monomers including, but not limited to, substituted and unsubstituted alkenes having two to 12 carbon atoms, such as ethylene, propylene, 1-butene, 1-pentene, 1-hexene, 1-heptene, 1-octene, 4-methylpent-1-ene, 1-decene, 1-dodecene, 1-hexadecene, and the like. The feed in lines 123, 109 can also include non-hydrocarbon gas(es) such as nitrogen, argon, helium, and/or hydrogen. The feed in lines 123, 109 can also be or include one or more inert compounds such as one or more induced condensing agents or ICAs. ICAs can include, but are not limited to, alkanes that may be condensable in the polymerization process for removing the heat of reaction. Illustrative ICAs can include, but are not limited to, propane, butane, isobutane, pentane, isopentane, hexane, isohexane, or any combination thereof.

The feed in lines 123, 109 can have a total monomer concentration of at least 50 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %. For example, the feed in lines 123, 109 may have an ethylene concentration of at least 50 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %.

The feed in lines 123, 109 can have an inert gas concentration, e.g., nitrogen, argon, helium, or any combination thereof of at least 50 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %.

The feed in lines 123, 109 can have an induced condensing agent ("ICA") concentration of at least 50 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %.

The feed in lines 123, 109 can have a combined monomer and inert gas concentration of at least 50 mol %, at least 60 mol %, at least 70 mol %, at least 80 mol %, at least 90 mol %, at least 95 mol %, at least 97 mol %, at least 98 mol %, at least 99 mol %, at least 99.9 mol %, or at least 99.99 mol %.

The feed via line 109 can be introduced to the nozzle 103 at a rate ranging from a low of about 100 kg/hr, about 450 kg/hr, about 800 kg/hr, about 1,000 kg/hr, or about 1,200 kg/hr to a high of about 1,350 kg/hr, about 1,500 kg/hr, about 1,800 kg/hr, about 2,000 kg/hr, about 2,200 kg/hr, about 2,500 kg/hr, about 2,700 kg/hr, or about 3,000 kg/hr, with suitable ranges comprising the combination of any two values.

The amount of the feed via line 109 introduced to the nozzle 103 can be less than about 40 wt %, less than about 30 wt %, less than about 25 wt %, less than about 20 wt %, less than about 15 wt %, less than about 10 wt %, less than about 7 wt %, less than about 5 wt %, or less than about 2 wt %, based on the amount of the one or more monomers consumed in the reactor 101. For example, the amount of the feed via line 109 introduced to the nozzle 103 can be from a low of about 0.01 wt %, about 0.1 wt %, about 1 wt %, about 2 wt %, about 5 wt %, about 10 wt %, about 12 wt %, about 15 wt %, or about 17 wt % to a high of about 20 wt %, about 23 wt %, about 25 wt %, about 27 wt %, or about 30 wt %, based on the amount of the one or more monomers consumed in the reactor 101, with suitable ranges comprising the combination of any two values. In another example, the amount of the feed introduced via line 109 to the nozzle 103 can be from about 0.1 wt % to about 3 wt %, about 1 wt % to about 3 wt %, about 1.5 wt % to about 2.5 wt %, about 2 wt % to about 4 wt %, about 3 wt % to about 8 wt %, about 5 wt % to about 15 wt %, about 10 wt % to about 30 wt %, about 15 wt % to about 25 wt %, about 18 wt % to about 26 wt %, about 19 wt % to about 22 wt %, or about 13 wt % to about 27 wt %, based on the amount of the one or more monomers consumed in the reactor 101. The amount of the feed via line 109 introduced to the nozzle 103 can be less than about 40 wt %, less than about 30 wt %, less than about 25 wt %, less than about 20 wt %, less than about 15 wt %, less than about 10 wt %, less than about 7 wt %, less than about 5 wt %, or less than about 2 wt %, based on the amount of any olefins consumed in the reactor 101. The amount of olefins can include olefins introduced via line 137, the recycle line 140, and/or the feed in line 109. In another example, the amount of the feed introduced via line 109 to the nozzle 103 can be from about 0.1 wt % to about 3 wt %, about 1 wt % to about 3 wt %, about 1.5 wt % to about 2.5 wt %, about 2 wt % to about 4 wt %, about 3 wt % to about 8 wt %, about 5 wt % to about 15 wt %, about 10 wt % to about 30 wt %, about 15 wt % to about 25 wt %, about 18 wt % to about 26 wt %, about 19 wt % to about 22 wt %, or about 13 wt % to about 27 wt %, based on the amount of any olefins consumed in the reactor 101. The amount of the feed via line 109 introduced to the nozzle 103 can be greater than the amount of the one or more monomers consumed in the reactor 101, e.g., during reactor start-up, idle conditions, and/or shut-down.

In particular embodiments, the process includes providing a first amount of feed and a second amount of feed. The first and second amounts of feed can be selected from the above-enumerated feed compositions.

As shown in FIG. 1, the feed introduced via line 109 and the catalyst introduced via line 105 to the nozzle 103 can each flow through the nozzle 103 without mixing or otherwise contacting one another within the nozzle 103, but instead can mix with one another within the fluidized bed 115. For example, upon exiting the nozzle 103 the catalyst and the feed can be mixed, blended, combined, or otherwise contacted with one another within the fluidized bed 115. In addition to contacting one another, upon exiting the nozzle 103 the catalyst and the feed can be mixed, blended, combined, or otherwise contacted with one or more monomers, catalyst particles, polymer particles, inert gases, and/or inert liquids that can make-up or form the fluidized bed 115. Although not shown, another suitable nozzle design can mix, blend, combine, or otherwise contact the feed introduced via line 109 to the nozzle 103 and the catalyst introduced via line 105 to the nozzle 103 within the nozzle 103. Also not shown, another suitable nozzle design can mix, blend, combine, or otherwise contact the feed in line 109 and the catalyst in line 105 prior to introduction to the nozzle 103 to form a feed and catalyst mixture and the mixture can be introduced to the nozzle 103. Illustrative nozzles can be similar to those discussed and described in U.S. Pat. Nos. 5,693,727; 5,962,606; 6,075,101; 6,211,310; 6,489,408; 6,500,905; and 7,989,562; U.S. Patent Application Publication Nos.: 20100298493 and 20100041841; and WO Publication Nos.: WO/2002/038629A2; WO/2008/042177A1; WO/2008/042078A1; and WO/2008/042182A1.

The heat exchanger 125 can be or include any apparatus or system capable of increasing the temperature of the feed in line 123 to a temperature greater than ambient temperature. The heat exchanger 125 can indirectly transfer heat from a heat transfer medium to the feed in line 123. Illustrative heat exchangers 125 can be or include one or more shell-and-tube, plate and frame, plate and fin, spiral wound, coil wound, U-tube, water tower, fans, fired, e.g., gas fired, and/or bayonet style heat exchangers. The one or more heat exchangers can also include surface enhanced structures (e.g., fins, static mixers, rifling, heat conductive packing, turbulence causing projections, or any combination thereof), and the like.

The temperature of the catalyst in line 105 may be from a low of about −10° C., about 0° C., about 10° C., about 15° C., or about 20° C. to a high of about 30° C., about 40° C., about 50° C., about 60° C., about 70° C., about 80° C., about 90° C., or about 100° C. when introduced to the nozzle 103, with any suitable range comprising the combination of any two values. For example, the temperature of the catalyst in line 105 can be from about 15° C. to about 40° C., about 10° C. to about 25° C., about 20° C. to about 30° C., about 15° C. to about 35° C., about 20° C. to about 45° C., or about 5° C. to about 40° C. In another example, the catalyst in line 105 can be at the ambient temperature the polymerization system 100 is operating at. In another example, the catalyst in line 105 can be at a temperature within about 1° C., about 3° C., about 5° C., about 7° C., about 10° C., about 12° C., about 15° C., about 17° C., or about 20° C. of the ambient temperature.

The catalyst in line 105 can be or include any catalyst or combination of catalysts. Illustrative catalysts can include, but are not limited to, Ziegler-Natta catalysts, chromium-based catalysts, metallocene catalysts and other catalytic compounds containing uniform polymerization sites single-site catalysts including Group 15-containing catalysts, bimetallic catalysts, and mixed catalysts. The catalyst can also include $AlCl_3$, cobalt, iron, palladium, chromium/chromium oxide or "Phillips" catalysts. Any catalyst can be used alone or in combination with any other catalyst. Catalyst compositions useful olefin polymerizations where the catalyst is in spray-dried form may be particularly benefited from the methods described herein.

The catalyst system may comprise a metallocene catalyst component. Metallocene catalysts can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom.

The Cp ligands are one or more rings or ring system(s), at least a portion of which includes π-bonded systems, such as cycloalkadienyl ligands and heterocyclic analogues. The ring(s) or ring system(s) typically comprise atoms selected from Groups 13 to 16 atoms, and, in some embodiments, the atoms that make up the Cp ligands are selected from carbon, nitrogen, oxygen, silicon, sulfur, phosphorous, germanium, boron, aluminum, and combinations thereof, where carbon makes up at least 50% of the ring members. For example, the Cp ligand(s) may be selected from substituted and unsubstituted cyclopentadienyl ligands and ligands isolobal to cyclopentadienyl. Non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene compound may be selected from Groups 3 through 12 atoms and lanthanide Group atoms; or may be selected from Groups 3 through 10 atoms; or may be selected from Sc, Ti, Zr, Hf, V, Nb, Ta, Mn, Re, Fe, Ru, Os, Co, Rh, Ir, and Ni; or may be selected from Groups 4, 5, and 6 atoms; or may be Ti, Zr, or Hf atoms; or may be Hf; or may be Zr. The oxidation state of the metal atom "M" can range from 0 to +7; or may be +1, +2, +3, +4 or +5; or may be +2, +3 or +4. The groups bound to the metal atom "M" are such that the compounds described below in the structures and structures are electrically neutral, unless otherwise indicated. The Cp ligand(s) forms at least one chemical bond with the metal atom M to form the "metallocene catalyst component." The Cp ligands are distinct from the leaving groups bound to metal atom M in that they are not highly susceptible to substitution/abstraction reactions.

The metallocene catalyst component may include compounds represented by Structure (I):

$$Cp^A Cp^B MX_n \qquad (I)$$

where M is as described above; each X is chemically bonded to M; each Cp group is chemically bonded to M; and n is 0 or an integer from 1 to 4. In some embodiments, n is either 1 or 2.

The ligands represented by $Cp^A$ and $Cp^B$ in Structure (I) may be the same or different cyclopentadienyl ligands or ligands isolobal to cyclopentadienyl, either or both of which may contain heteroatoms and either or both of which may be substituted by a group R. For example, $Cp^A$ and $Cp^B$ may be independently selected from cyclopentadienyl, indenyl, tetrahydroindenyl, fluorenyl, and substituted derivatives of each.

Independently, each $Cp^A$ and $Cp^B$ of Structure (I) may be unsubstituted or substituted with any one or combination of substituent groups R. Non-limiting examples of substituent groups R as used in Structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyl thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with Structure (I) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyl-diethylsilyl and the like; and halocarbyl-substituted organo-metalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins, such as, but not limited to, olefinically unsaturated substituents including vinyl-terminated ligands, for example 3-butenyl, 2-propenyl, 5-hexenyl, and the like. In some embodiments, at least two R groups, for example, two adjacent R groups, are joined to form a ring structure having from 3 to 30 atoms selected from carbon, nitrogen, oxygen, phosphorous, silicon, germanium, aluminum, boron and combinations thereof. Also, a substituent R group, such as 1-butanyl, may form a bonding association to the element M.

Each X in Structure (I), above, and Structures (II)-(Va-d), below, is independently selected from: for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, X is a $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, or $C_1$ to $C_{12}$ heteroatom-containing hydrocarbons, and substituted derivatives thereof. X may be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, or $C_7$ to $C_{18}$ fluoroalkylaryls; or X may be selected from hydride, chloride, fluoride, methyl, phenyl, phenoxy, benzoxy, tosyl, fluoromethyls, and fluorophenyls; or X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or X may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or X may be selected from fluoride, methyl, ethyl, propyl, phenyl, methylphenyl, dimethylphenyl, trimethylphenyl, fluoromethyls (mono-, di- and trifluoromethyls), and fluorophenyls (mono-, di-, tri-, tetra- and pentafluorophenyls). In some embodiments, at least one X is a halogenated aryloxy group or a derivative thereof. For example, at least one X may be a pentafluorophenoxy group.

The metallocene catalyst component may include those metallocenes of Structure (I) where $Cp^A$ and $Cp^B$ are bridged to each other by at least one bridging group, (A), such that the structure is represented by Structure (II):

$$Cp^A(A)Cp^B MX_n \qquad (II)$$

These bridged compounds represented by Structure (II) are known as "bridged metallocenes." $Cp^A$, $Cp^B$, M, X and n in Structure (II) are as defined above for Structure (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, and divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for Structure (I) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R')_2Si(R'_2)—$, $R'_2Ge=$, $R'P=$ (wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of Structure (II) has two or more bridging groups (A).

Other non-limiting examples of bridging group (A), in Structure (II), include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In some embodiments, bridging group (A), in Structure (II), may also be cyclic, comprising, 4 to 10 ring members or 5 to 7 ring members. The ring members may be selected from the elements mentioned above, or from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination thereof.

The cyclic bridging groups (A) may be saturated or unsaturated and/or carry one or more substituents and/or be fused to one or more other ring structures. If present, the one or more substituents may be a hydrocarbyl (e.g., alkyl such as methyl) or halogen (e.g., F, Cl). The one or more Cp groups which the above cyclic bridging moieties may optionally be fused to may be saturated or unsaturated and are selected from those having 4 to 10, more particularly 5, 6, or 7 ring members (selected from C, N, O and S in a particular embodiment), such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

In some embodiments, the ligands $Cp^A$ and $Cp^B$ of Structures (I) and (II) may be different from each other, or in other embodiments may be the same as each other.

The metallocene catalyst component may include monoligand metallocene compounds, such as, monocyclopentadienyl catalyst components, as described in WO 93/08221.

The metallocene catalyst component may be an unbridged "half sandwich" metallocene represented by Structure (III):

$$Cp^A MQ_q X_n \qquad (III)$$

where $Cp^A$ is defined as for the Cp groups in Structure (I) and is a ligand that is bonded to M; each Q is independently bonded to M; Q is also bound to $Cp^A$ in one embodiment; X is a leaving group as described above in Structure (I); n ranges from 0 to 3, or is 1 or 2; q ranges from 0 to 3, or is 1 or 2.

$Cp^A$ may be selected from cyclopentadienyl, indenyl, tetrahydroindenyl, fluorenyl, substituted version thereof, and combinations thereof. In Structure (III), Q may be selected from $ROO^-$, $RO—$, $R(O)—$, $—NR—$, $—CR_2—$, $—S—$, $—NR_2$, $—CR_3$, $—SR$, $—SiR_3$, $—PR_2$, $—H$, and substituted and unsubstituted aryl groups, wherein R is selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. R may be selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

It is contemplated that the metallocene catalysts components described above include their structural or optical or enantiomeric isomers (racemic mixture), and may be a pure enantiomer in one embodiment. As used herein, a single, bridged, asymmetrically substituted metallocene catalyst component having a racemic and/or meso isomer does not, itself, constitute at least two different bridged, metallocene catalyst components. The "metallocene catalyst compound", also referred to herein as the metallocene catalyst component" may comprise any combination of any "embodiment" described herein.

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. For example, the Group 15-containing catalyst component can be a complex of a Group 4 metal and from one to four ligands such that the Group 4 metal is at least 2 coordinate, the coordinating moiety or moieties including at least two nitrogens. Representative Group 15-containing compounds are disclosed in WO Publication No. WO 99/01460; European Publication Nos. EP0893454A1; EP 0894005A1; U.S. Pat. Nos. 5,318,935; 5,889,128; 6,333,389; and 6,271,325.

The Group 15-containing catalyst components may include Group 4 imino-phenol complexes, Group 4 bis (amide) complexes, and Group 4 pyridyl-amide complexes that are active towards olefin polymerization to any extent.

The Group 15-containing catalyst component may be represented by Structures (VII) and (VIII):

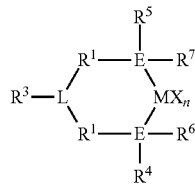

(VII)

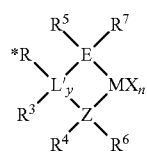

(VIII)

wherein E and Z are Group 15 elements independently selected from nitrogen and phosphorus in one embodiment; and nitrogen in a more particular embodiment, L and L' may or may not form a bond with M; y is an integer ranging from 0 to 2 (when y is 0, group L', *R and $R^3$ are absent); M is selected from Group 3 to Group 5 atoms, or Group 4 atoms, or selected from Zr and Hf; n is an integer ranging from 1 to 4, or from 2 to 3; and each X is as defined above.

In Structure (VII), L may be selected from Group 15 atoms, Group 16 atoms, Group 15-containing hydrocarbylenes, and a Group 16-containing hydrocarbylenes; wherein $R^3$ is absent when L is a Group 16 atom. In some embodiments, when $R^3$ is absent, L is selected from heterocyclic hydrocarbylenes; or L is selected from nitrogen, phosphorous, anilinyls, pyridyls, quinolyls, pyrrolyls, pyrimidyls, purinyls, imidazyls, indolyls; $C_1$ to $C_6$ alkyl substituted groups selected from anilinyls, pyridyls, quinolyls, pyrrolyls, pyrimidyls, purinyls, imidazyls, and indolyls; $C_1$ to $C_6$ alkylamine substituted groups selected from anilinyls, pyridyls, quinolyls, pyrrolyls, pyrimidyls, purinyls, imidazyls, indolyls; amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, substituted derivatives thereof, and chemically bonded combinations thereof.

In Structure (VIII), L' is selected from Group 15 atoms, Group 16 atoms, and Group 14 atoms in one embodiment; and selected from Group 15 and Group 16 atoms in a more particular embodiment; and is selected from groups as defined by L above in yet a more particular embodiment, wherein "EZL" and "EZL'" may be referred to as a "ligand", the EZL and EZL' ligands comprising the R* and $R^1$-$R^7$ groups;

In Structure (VII), $R^1$ and $R^2$ are independently: divalent bridging groups selected from alkylenes, arylenes, heteroatom containing alkylenes, heteroatom containing arylenes, substituted alkylenes, substituted arylenes and substituted heteroatom containing alkylenes, wherein the heteroatom is selected from silicon, oxygen, nitrogen, germanium, phosphorous, boron and sulfur; or is selected from $C_1$ to $C_{20}$ alkylenes, $C_6$ to $C_{12}$ arylenes, heteroatom-containing $C_1$ to $C_{20}$ alkylenes, and heteroatom-containing $C_6$ to $C_{12}$ arylenes; or is selected from —$CH_2$—, —$C(CH_3)_2$—, —$C(C_6H_5)_2$—, —$CH_2CH_2$—, —$CH_2CH_2CH_2$—, —$Si(CH_3)_2$—, —$Si(C_6H_5)_2$—, —$C_6H_{10}$—, —$C_6H_4$—, and substituted derivatives thereof, the substitutions including $C_1$ to $C_4$ alkyls, phenyl, and halogen radicals.

In Structure (VIII), $R^3$ may be absent; or may be a group selected from hydrocarbyl groups, hydrogen radical, halogen radicals, and heteroatom-containing groups; or may be selected from linear alkyls, cyclic alkyls, and branched alkyls having 1 to 20 carbon atoms.

In Structure (VIII), *R may be absent; or may be a group selected from hydrogen radical, Group 14 atom containing groups, halogen radicals, and heteroatom-containing groups.

In Structures (VII) and (VIII), $R^4$ and $R^5$ are independently: groups selected from alkyls, aryls, substituted aryls, cyclic alkyls, substituted cyclic alkyls, cyclic arylalkyls, substituted cyclic arylalkyls, and multiple ring systems, wherein each group has up to 20 carbon atoms, or between 3 and 10 carbon atoms; or is selected from $C_1$ to $C_{20}$ alkyls, $C_1$ to $C_{20}$ aryls, $C_1$ to $C_{20}$ arylalkyls, and heteroatom-containing groups (for example $PR_3$, where R is an alkyl group).

In Structures (VII) and (VIII), $R^6$ and $R^7$ are independently: absent; or are groups selected from hydrogen radicals, halogen radicals, heteroatom-containing groups and hydrocarbyls; or are selected from linear, cyclic and branched alkyls having from 1 to 20 carbon atoms; wherein $R^1$ and $R^2$ may be associated with one another, and/or $R^4$ and $R^5$ may be associated with one another as through a chemical bond.

Described yet more particularly, the Group 15-containing catalyst component can be described as the embodiments shown in Structures (IX), (X) and (XI) (where "N" is nitrogen):

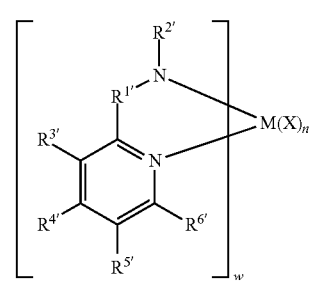

(IX)

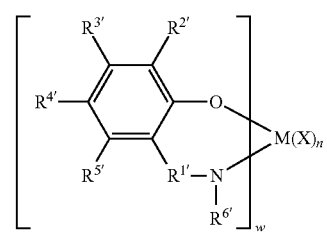

(X)

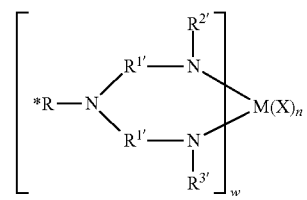

(XI)

wherein Structure (IX) represents pyridyl-amide structures, Structure (X) represents imino-phenol structures, and Structure (XI) represents bis(amide) structures. In these Structures, w is an integer from 1 to 3, or is 1 or 2, or is 1 in some embodiments. M is a Group 3 to Group 13 element, or a Group 3 to Group 6 element, or Group 4 element in some embodiments. Each X is independently selected from hydrogen radicals, halogen ions (desirably, anions of fluorine, chlorine, and bromine); $C_1$ to $C_6$ alkyls; $C_1$ to $C_6$ fluoroalkyls, $C_6$ to $C_{12}$ aryls; $C_6$ to $C_{12}$ fluoroalkyls, $C_1$ to $C_6$ alkoxys, $C_6$ to $C_{12}$ aryloxys, and $C_7$ to $C_{18}$ alkylaryloxys. n is an integer ranging from 0 to 4, or from 1 to 3, or from 2 to 3, or is 2 in some embodiments.

Further, in Structures (IX), (X), and (XI), $R^{1'}$ may be selected from hydrocarbylenes and heteroatom-containing hydrocarbylenes, or may be selected from $-SiR_2-$, alkylenes, arylenes, alkenylenes and substituted alkylenes, substituted alkenylenes and substituted arylenes; or may be selected from $-SiR_2-$, $C_1$ to $C_6$ alkylenes, $C_6$ to $C_{12}$ arylenes, $C_1$ to $C_6$ substituted alkylenes and $C_6$ to $C_{12}$ substituted arylenes, wherein R is selected from $C_1$ to $C_6$ alkyls and $C_6$ to $C_{12}$ aryls.

Further, in Structures (IX), (X), and (XI), $R^{1'}$, $R^{2'}$, $R^{3'}$, $R^{4'}$, $R^{5'}$, $R^{6'}$ and $R^*$ are independently selected from hydride, $C_1$ to $C_{10}$ alkyls, $C_6$ to $C_{12}$ aryls, $C_6$ to $C_{18}$ alkylaryls, $C_4$ to $C_{12}$ heterocyclic hydrocarbyls, substituted $C_1$ to $C_{10}$ alkyls, substituted $C_6$ to $C_{12}$ aryls, substituted $C_6$ to $C_{18}$ alkylaryls, and substituted $C_4$ to $C_{12}$ heterocyclic hydrocarbyls and chemically bonded combinations thereof. In some embodiments, $R^*$ is absent. In some embodiments, $R^*-N$ represents a nitrogen containing group or ring such as a pyridyl group or a substituted pyridyl group that is bridged by the $R^{1'}$ groups. In some embodiments, $R^*-N$ is absent, and the $R^{1'}$ groups form a chemical bond to one another.

In some embodiments of Structures (IX), (X), and (XI), $R^{1'}$ is selected from methylene, ethylene, 1-propylene, 2-propylene, $=Si(CH_3)_2$, $=Si(phenyl)_2$, $-CH=$, $-C(CH_3)=$, $-C(phenyl)_2-$, $-C(phenyl)=$ (wherein "=" represents two chemical bonds), and the like.

In a particular embodiment of Structure (X), $R^{2'}$ and $R^{4'}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 2-methyl-4-chlorophenyl, 2-n-propyl-4-chlorophenyl, 2-iso-propyl-4-chlorophenyl, 2-iso-butyl-4-chlorophenyl, 2-tert-butyl-4-chlorophenyl, 2-methyl-4-fluorophenyl, 2-n-propyl-4-fluorophenyl, 2-iso-propyl-4-fluorophenyl, 2-iso-butyl-4-fluorophenyl, 2-tert-butyl-4-fluorophenyl, 2-methyl-4-bromophenyl, 2-n-propyl-4-bromophenyl, 2-iso-propyl-4-bromophenyl, 2-iso-butyl-4-bromophenyl, 2-tert-butyl-4-bromophenyl, and the like.

In some embodiments of Structures (IX) and (XI), $R^{2'}$ and $R^{3'}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 4-methylphenyl, 4-n-propylphenyl, 4-iso-propylphenyl, 4-iso-butylphenyl, 4-tert-butylphenyl, 4-fluorophenyl, 4-chlorophenyl, 4-bromophenyl, 6-methylphenyl, 6-n-propylphenyl, 6-iso-propylphenyl, 6-iso-butylphenyl, 6-tert-butylphenyl, 6-fluorophenyl, 6-chlorophenyl, 6-bromophenyl, 2,6-dimethylphenyl, 2,6-di-n-propylphenyl, 2,6-di-iso-propylphenyl, 2,6-di-isobutylphenyl, 2,6-di-tert-butylphenyl, 2,6-difluorophenyl, 2,6-dichlorophenyl, 2,6-dibromophenyl, 2,4,6-trimethylphenyl, 2,4,6-tri-n-propylphenyl, 2,4,6-tri-iso-propylphenyl, 2,4,6-tri-iso-butylphenyl, 2,4,6-tri-tert-butylphenyl, 2,4,6-trifluorophenyl, 2,4,6-trichlorophenyl, 2,4,6-tribromophenyl, 2,3,4,5,6-pentafluorophenyl, 2,3,4,5,6-pentachlorophenyl, 2,3,4,5,6-pentabromophenyl, and the like.

In some embodiments of Structures (IX), (X), and (XI), X is independently selected from fluoride, chloride, bromide, methyl, ethyl, phenyl, benzyl, phenyloxy, benzloxy, 2-phenyl-2-propoxy, 1-phenyl-2-propoxy, 1-phenyl-2-butoxy, 2-phenyl-2-butoxy and the like.

Non-limiting examples of the Group 15-containing catalyst component are represented by Structures (XIIa)-(XIIf) (where "N" is nitrogen):

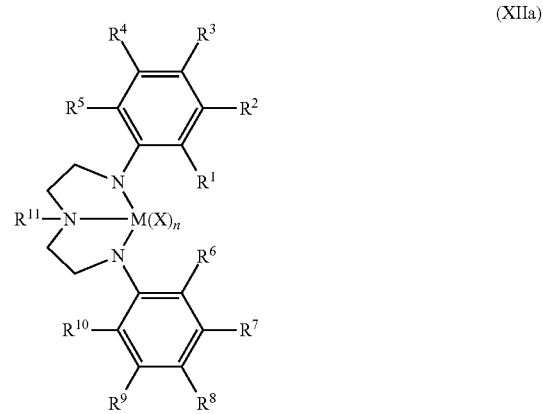

(XIIa)

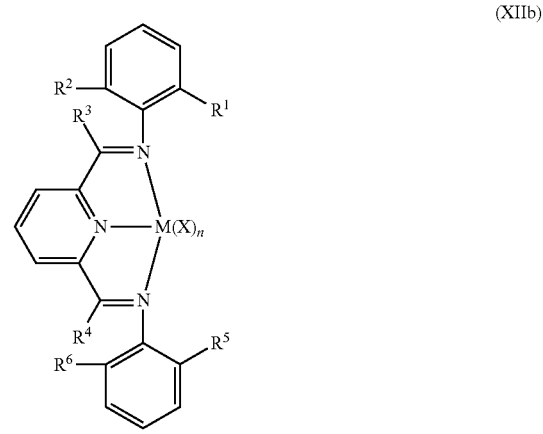

(XIIb)

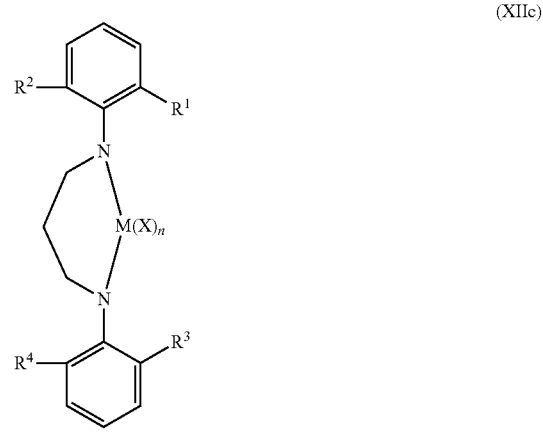

(XIIc)

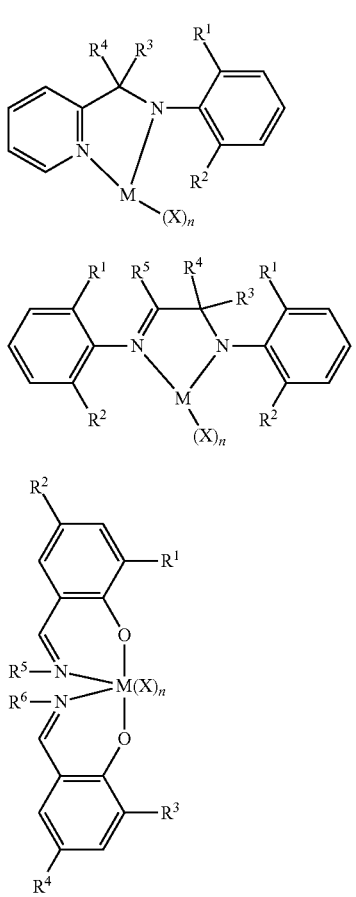

wherein in Structures (XIIa) through (XIIf), M is selected from Group 4 atoms or is selected from Zr and Hf; and wherein $R^1$ through in Structures (XIIa) through (XIIf) are selected from hydride, fluorine radical, chlorine radical, bromine radical, methyl, ethyl, n-propyl, isopropyl, n-butyl, isobutyl, tert-butyl and phenyl; and X is selected from fluorine ion, chlorine ion, bromine ion, methyl, phenyl, benzyl, phenyloxy and benzyloxy; and n is an integer ranging from 0 to 4, or from 2 to 3.

The catalyst may be a mixed catalyst which may comprise a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one example, the mixed catalyst includes at least one metallocene catalyst component and at least one non-metallocene component.

The catalyst in line 105 can be or include a mixed catalyst that includes at least one metallocene component. The catalyst in line 105 may be a mixed catalyst system that includes at least one metallocene component and at least one Group-15 containing component. The metallocene components and Group-15 containing components may be as described above. For example, the mixed catalyst may comprise $[(2,4,6-Me_3C_6H_2)NCH_2CH_2]_2NHHfBz_2$ or $[(2,4,6-Me_3C_6H_2)NCH_2CH_2]_2NHZrBz_2$ or $[(2,3,4,5,6-Me_5C_6)NCH_2CH_2]_2NHZrBz_2$, where Bz is a benzyl group, combined with bis(indenyl)zirconium dichloride, (pentamethylcyclopentadienyl)(n-propylcyclopentadienyl) zirconium dichloride, or (tetramethylcyclopentadienyl)(n-propylcyclopentadienyl)zirconium dichloride.

An example of mixed catalyst systems suitable for use herein is the PRODIGY™ Bimodal Catalysts available from Univation Technologies.

An activator may be used with the catalyst compound. As used herein, the term "activator" refers to any compound or combination of compounds, supported or unsupported, which can activate a catalyst compound or component, such as by creating a cationic species of the catalyst component. Illustrative activators include, but are not limited to, aluminoxane (e.g., methylaluminoxane "MAO"), modified aluminoxane (e.g., modified methylaluminoxane "MMAO" and/or tetraisobutyldialuminoxane "TIBAO"), and alkylaluminum compounds, ionizing activators (neutral or ionic) such as tri (n-butyl)ammonium tetrakis(pentafluorophenyl)boron may be also be used, and combinations thereof. The molar ratio of metal in the activator to metal in the catalyst composition can range from 1000:0.1 to 0.5:1, 300:1 to 0.5:1, 150:1 to 1:1, 50:1 to 1:1, 10:1 to 0.5:1, or 3:1 to 0.3:1.

The catalyst compositions can include a support material or carrier. As used herein, the terms "support" and "carrier" are used interchangeably and refer to any support material, including a porous support material, for example, talc, inorganic oxides, and inorganic chlorides. The catalyst component(s) and/or activator(s) can be deposited on, contacted with, vaporized with, bonded to, or incorporated within, adsorbed or absorbed in, or on, one or more supports or carriers. Other support materials can include resinous support materials such as polystyrene, functionalized or cross-linked organic supports, such as polystyrene divinyl benzene polyolefins or polymeric compounds, zeolites, clays, or any other organic or inorganic support material and the like, or mixtures thereof. In some embodiments, relatively small, non-porous supports may be beneficial, e.g., silica particles having a diameter of about 15 to about 200 nm suitable for forming spray-dried catalyst particles having a diameter of about 20 to about 40 μm.

The catalyst via line 105 can be introduced to the nozzle 103 at a flow rate from a low of about 0.001 kg/hr, about 0.005 kg/hr, about 0.02 kg/hr, 0.1 kg/hr, about 0.5 kg/hr, about 1 kg/hr, about 1.5 kg/hr, about 2 kg/hr, or about 3 kg/hr to a high of about 5 kg/hr, about 10 kg/hr, about 15 kg/hr, about 20 kg/hr, or about 25 kg/hr, with suitable ranges comprising the combination of any two values. For example, the catalyst via line 105 can be introduced to the nozzle 103 at a flow rate of about 0.4 kg/hr to about 23 kg/hr, about 1.4 kg/hr to about 14 kg/hr, or about 2.3 kg/hr to about 4.5 kg/hr. The catalyst in line 105 can be or include fully formed catalyst particles suspended in one or more inert liquids, e.g., in the form of a catalyst slurry or suspension. For example, the concentration of the catalyst particles in a catalyst slurry can range from a low of about 1 wt %, about 5 wt %, about 12 wt %, or about 15 wt % to a high of about 20 wt %, about 23 wt %, about 25 wt %, or about 30 wt %, with suitable ranges comprising the combination of any two values. The catalyst can be slurried in any suitable liquid or combination of liquids. Suitable liquids for forming the catalyst slurry can include but are not limited to toluene, ethylbenzene, xylene, pentane, hexane, heptane, octane, other hydrocarbons, or any combination thereof. One or more mineral oils or other non-reactive liquid hydrocarbons can also be used to form the catalyst slurry. The catalyst system in line 105 can be or include catalyst particles that are at least partially dissolved in one or more inert liquids. The catalyst in line 105 can be or include catalyst particles that are substantially, if not completely, dissolved in the one or more inert liquids. The catalyst system in line 105 can be in the form of a powder, e.g., a spray dried catalyst.

Referring again to the polymerization system 100, the reactor 101 can include a cylindrical section 130, a transition section 133, and the velocity reduction zone or dome 135. The cylindrical section 130 is disposed adjacent the transition section 133. The transition section 133 can expand from a first diameter that corresponds to the diameter of the cylindrical section 130 to a larger diameter adjacent the dome 135. The location or junction at which the cylindrical section 130 connects to the transition section 133 is referred to as the "neck" or the "reactor neck." The dome 135 may have a bulbous shape. One or more cycle fluid or recycle lines 140 can be in fluid communication with the top head 135.

A reactor feed via line 137 can be introduced to the polymerization system 100 at any point. For example, the reactor feed via line 137 can be introduced to the cylindrical section 130, the transition section 133, the velocity reduction zone 135, to any point within the recycle line 140, or any combination thereof. Preferably, the reactor feed 137 is introduced to the recycle line 140 before or after the heat exchanger 175. In FIG. 1, the reactor feed via line 137 is introduced to the recycle line 140 after the heat exchanger 175. The nozzle 103 can be in fluid communication with the polymerization system 100 at any point. Preferably the nozzle 103 is in fluid communication with the fluidized bed 115 within the cylindrical section 130.

The reactor feed in line 137 can include any polymerizable hydrocarbon of combination of hydrocarbons. For example, the reactor feed in line 137 can be any olefin monomer including substituted and unsubstituted alkenes having two to 12 carbon atoms, such as ethylene, propylene, 1-butene, 1-pentene, 1-hexene, 1-heptene, 1-octene, 4-methylpent-1-ene, 1-decene, 1-dodecene, 1-hexadecene, and the like. The reactor feed in line 137 can also include non-hydrocarbon gas(es) such as nitrogen and/or hydrogen. The reactor feed 137 can enter the reactor at multiple locations. For example, reactor feed 137 can be introduced into the fluidized bed 115 in various ways including direct injection through a nozzle (not shown). The polymer product via line 145 can thus be a homopolymer or a copolymer, including a terpolymer, having one or more other monomeric units. For example, a polyethylene product could include at least one or more other olefin(s) and/or comonomer(s). The reactor feed in line 137 can also include one or more inert components such as one or more induced condensing agents or ICAs. The reactor feed in line 137 can also include other non-reactive or inert gases such as nitrogen and/or argon. The feed in lines 123, 109 can be or include a portion of the reactor feed in line 137. As such, the feed in lines 123, 109 and the reactor feed in line 137 can have the same or similar compositions with respect to one another.

The reactor can be operated in condensed mode using an ICA. The amount of ICAs that can be introduced to the reactor 101, whether via the feed in line 109 and/or the reactor feed in line 137 can provide an ICA concentration within the polymerization reactor 101 ranging from a low of about 1 mol %, about 5 mol %, or about 10 mol % to a high of about 25 mol %, about 35 mol %, or about 45 mol %, with suitable ranges comprising the combination of any two values. For example, the concentration of the ICA(s), if present, can range from about 14 mol %, about 16 mol %, or about 18 mol % to a high of about 20 mol %, about 22 mol %, or about 24 mol %, with suitable ranges comprising the combination of any two values. Suitable ICAs are known in the art.

The recycle fluid in line 140 can be compressed in the compressor 170 and then passed through the heat exchanger 175 where heat can be exchanged between the recycle fluid and a heat transfer medium. For example, during normal operating conditions a cool or cold heat transfer medium via line 171 can be introduced to the heat exchanger 175 where heat can be transferred from the recycle fluid in the recycle line 140 to produce a heated heat transfer medium via line 177 and a cooled recycle fluid. The heat exchanger 175 can be used to cool the fluidized bed 115 or heat the fluidized bed 115 depending on the particular operating conditions of the polymerization system 100, e.g., start-up, normal operation, idling, and shut down. It is also possible to locate the compressor 170 downstream from the heat exchanger 175 or at an intermediate point between several heat exchangers 175.

After cooling, all or a portion of the recycle fluid in the recycle line 140, the recycle fluid can be returned to the reactor 101. The cooled recycle fluid in recycle line 140 can absorb at least a portion of the heat of reaction generated by the polymerization reaction and/or polymerize in the presence of the catalyst. The heat exchanger 175 can be of any type of heat exchanger. Preferably, the cycle gas via line 140 is returned to the fluidized bed 115 through a fluid distributor plate ("plate") 128. The plate 128 is preferably installed at the inlet to the reactor 101 to prevent polymer particles from settling out and agglomerating into a solid mass and to prevent liquid accumulation at the bottom of the reactor 101 as well to facilitate easy transitions between processes which contain liquid in the cycle stream 140 and those which do not and vice versa.

The conditions for polymerization can vary depending, at least in part, on the monomers, catalysts, and equipment availability. The specific conditions are known or readily derivable by those skilled in the art. As noted above, the temperature of the fluidized bed 115 can be from about −10° C. to about 140° C. The pressure within the reactor 101 can be from about 10 kPag to about 10,000 kPag, or from about 500 kPag to about 5,000 kPag, or from about 1,700 kPag to about 2,200 kPag. Additional details of polymerization are described in U.S. Pat. No. 6,627,713.

Antistatic substances can also be added, either continuously or intermittently to prevent or neutralize electrostatic charge generation. A static control agent or continuity additive is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst compound(s) being used.

Control agents such as aluminum stearate or aluminum distearate may be employed. The static control agent used may be selected for its ability to receive the static charge in the fluidized bed without adversely affecting productivity. Suitable static control agents may include aluminum distearate, ethoxlated amines, and compositions such as those provided by Innospec Inc. under the trade name OCT- ASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include, ethyleneimine additives useful in embodiments disclosed herein may include polyethyleneimines having the following general formula:

—$(CH_2—CH_2—NH)_n$— where n can be from about 10 to about 10,000. Commercial polyethyleneimine can be a compound having branches of the ethyleneimine polymer. Suitable polyethyleneimines are commercially available from BASF Corporation under the trade name Lupasol. Another useful continuity additive can include a mixture of aluminum distearate and an ethoxylated amine type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt % to about 50 wt % or about 10 wt % to about 40 wt %, or about 15 wt % to about 30 wt %.

The continuity additive(s) or static control agent(s) may be added to the reactor in an amount ranging from 0.05 to 200 ppm, based on the weight of all feeds to the reactor, excluding recycle, more preferably in an amount ranging from 2 to 100 ppm; more preferably from 4 to 50 ppm.

Considering the polymer product via line 168, the polymer can be or include any type of polymer or polymeric material. Suitable polyolefins can include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, or $C_3$ to $C_{10}$ alpha-olefins. Preferred polyolefins include, but are not limited to, polymers comprising ethylene, including but not limited to ethylene copolymerized with a $C_3$ to $C_{40}$ olefin, preferably a $C_3$ to $C_{20}$ alpha olefin, such as propylene and/or butene.

Preferred polymer products include homopolymers or copolymers of $C_2$ to $C_{40}$ olefins, preferably $C_2$ to $C_{20}$ olefins, such as copolymers of an alpha-olefin and another olefin or alpha-. Examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymers of propylene and ethylene and/or butene and/or hexene, elastomers such as ethylene propylene rubber, ethylene propylene diene monomer rubber, neoprene, and blends of thermoplastic polymers and elastomers, such as for example thermoplastic elastomers and rubber toughened plastics.

Density can be determined in accordance with ASTM D-792. Density is expressed as grams per cubic centimeter ($g/cm^3$) unless otherwise noted. The polyethylene can have a density ranging from a low of about 0.89 $g/cm^3$, about 0.90 $g/cm^3$, or about 0.91 $g/cm^3$ to a high of about 0.95 $g/cm^3$, about 0.96 $g/cm^3$, or about 0.97 $g/cm^3$, with suitable ranges comprising the combination of any two values. The polyethylene can have a bulk density, measured in accordance with ASTM D1895 method B, of from about 0.25 $g/cm^3$ to about 0.5 $g/cm^3$. For example, the bulk density of the polyethylene can range from a low of about 0.30 $g/cm^3$, about 0.32 $g/cm^3$, or about 0.33 $g/cm^3$ to a high of about 0.40 $g/cm^3$, about 0.44 $g/cm^3$, or about 0.48 $g/cm^3$, with suitable ranges comprising the combination of any two values.

Typically the polymer composition comprises ≥ about 5.0 wt. %, e.g., ≥ about 6.0 wt. %, ≥ about 7.0 wt. %, ≥ about 8.0 wt. %, or ≥ about 9.0 wt. % fines, i.e., particles having a size sufficient to pass through a 120 mesh (U.S.) screen, e.g. ≤ 125 μm. Additionally or alternatively, the polymer composition comprises ≤ about 10 wt. %, e.g., ≤ about 9.0 wt. %, ≤ about 8.0 wt. %, ≤ about 7.0 wt. %, or ≤ about 6.0 wt. % fines. A more particular description for indicating particle size distribution using mesh size is to use + and − designations. A "+" before the sieve mesh indicates the particles are retained by the sieve, while a "−" before the sieve mesh indicates the particles pass through the sieve. This means that typically 90% or more of the particles will have mesh sizes between the two values. For instance, if the particle size of a material is described as −80/+170, then 90% or more of the material will pass through an 80 mesh sieve and be retained by a 170 mesh sieve. Thus, in some embodiments, the polymer composition may have a particle size distribution of −10/+125 mesh, e.g., −25/+90 mesh, −30/+85 mesh, −35/+80 mesh.

The polyethylene can be suitable for such articles as films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

Test Methods

Melt index is determined according to ASTM D-1238-E (190° C./5.0 kg), also sometimes referred to as $I_5$. "High Load Melt Index," also designated $I_{21}$ or $I_{21.6}$, is also determined according to ASTM D-1238, but at a temperature of 190° C. using a 21.6 kg mass (i.e., 190° C./21.6 kg). Melt Flow Ratio (MFR) as used herein refers to the ratio of $I_{21}/I_5$.

EXAMPLES

To provide a better understanding of the foregoing discussion, the following non-limiting examples are provided. All parts, proportions and percentages are by weight unless otherwise indicated.

Polymerization Process

In the following Examples 1-4, a mixed catalyst system that produces bimodal polyethylene was evaluated using a pilot plant gas phase polymerization process. The polymerization reactions were conducted in a continuous pilot-scale gas phase fluidized bed reactor of 0.57 meters internal diameter and 4 meters in bed height. The fluidized bed was made up of polymer granules. The gaseous feed streams of ethylene and hydrogen together with liquid comonomer (hexene) were mixed together in a mixing tee arrangement and introduced below the reactor bed into the recycle gas line. The individual flow rates of ethylene, hydrogen, and comonomer were controlled to maintain fixed composition targets. The comonomer was also controlled to maintain a constant comonomer to ethylene mole ratio. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream. Isopentane was also feed to the reactor.

The reaction bed of growing polymer particles within the reactor was maintained in a fluidized state by the continuous flow of a make-up feed and recycle gas through the reaction zone. To maintain the fluidized state within the reactor the superficial gas velocity was kept from 0.6 m/s to 0.8 m/s. The reactor was operated at a total pressure of 2,170 kPa and the reactor temperature was adjusted based depending on desired product.

The mixed catalyst system was mixed with carrier fluids (isopentane and nitrogen) to provide a catalyst slurry and injected directly into the reactor using a nozzle having a tube in a tube assembly that was disposed inside a support tube. The tip of the tube in the tube assembly extended past the end of the support tube by 6 mm to 26 mm. The outer diameter of the catalyst tube assembly was 6.35 mm. The support tube was a pipe inserted inside the reactor with a diameter of 15.875 mm. The rate of the catalyst slurry introduced to the reactor was adjusted to maintain a constant production rate of polymer. In the annular space between the outside of the catalyst tube and the inside of the support tube, a flow of gas "fluid" was used to help disperse the catalyst into the reactor and to keep the tip of the catalyst tube clean to prevent formation of agglomerates. The feed was recycle or "cycle" gas recovered from the top of the reactor, and contained primarily ethylene. The feed was introduced at a rate of about 1,000 kg/hr.

The fluidized bed height was maintained by withdrawing a portion of the bed at a rate equal to the rate of formation of particulate product. The rate of product formation (the polymer production rate) was in the range of 45 to 90 kg/hour. The recovered product was purged to remove entrained and dissolved hydrocarbons and treated with a small steam of humidified nitrogen to deactivate any trace quantities of residual catalyst. To maintain a constant reactor temperature, the temperature of the recycle gas entering the reactor was adjusted, i.e., heated or cooled as necessary, to accommodate any changes in the rate of heat generation due to the polymerization.

Catalyst System

The mixed catalyst system used in Examples 1-4 and 7-13 included a first metallocene catalyst compound, $((Me_4Cp)(n\text{-}pr\text{-}Cp)ZrMe_2)$, as a solution trim catalyst in conjunction with a mixture of a non-metallocene catalyst $([(2,3,4,5,6\text{-}Me_5C_6)NCH_2CH_2]_2NHZrBz_2$, where Bz is a benzyl group), and a second metallocene catalyst, $((Me_4Cp)(n\text{-}pr\text{-}Cp)ZrCl_2)$. A methylaluminoxane activator was used. The mixed catalyst system of Examples 5 and 6, was similar to the catalyst system used in Examples 1-4 and 7-13 except that it included only the non-metallocene catalyst and the second metallocene catalyst. With this catalyst system, a portion of the second metallocene catalyst was added as a solution trim catalyst. Methods of preparing catalysts of this type are disclosed in, for example, U.S. Pat. No. 6,271,325.

Examples 1-4

In Examples 1-4, four separate polymerization runs were conducted with each one operating with a different feed temperature. Table 1 summarizes the polymerization results for these examples.

TABLE 1

| | Examples 1-4 | | | |
|---|---|---|---|---|
| | Polymerization Run | | | |
| | 1 | 2 | 3 | 4 |
| Reactor Conditions | | | | |
| Residence Time (hrs) | 7.08 | 5.82 | 5.28 | 5.72 |
| $C_2$ Partial Pressure (psia) | 220 | 220 | 220 | 220 |
| $H_2/C_2$ Conc. Ratio (ppm/m %) | 20.03 | 20.00 | 20.03 | 19.99 |
| $C_6/C_2$ Conc. Ratio (m/m) | 0.0057 | 0.0056 | 0.0057 | 0.0057 |
| Ethylene (mol %) | 70.0 | 70.0 | 70.0 | 70.0 |
| Isopentane (mol %) | 7.7 | 7.7 | 7.7 | 7.7 |
| Nitrogen (mol %) | 21.79 | 21.73 | 21.79 | 21.75 |
| Reaction Pressure (psig) | 300.0 | 300.0 | 300.0 | 300.0 |
| Reaction Temperature (° C.) | 105.7 | 105.9 | 105.7 | 105.9 |
| Gas Velocity (ft/sec) | 1.95 | 1.95 | 1.95 | 1.95 |
| Bed Weight (lbs) | 593 | 592 | 593 | 595 |
| Bed Height (ft) | 16.34 | 12.71 | 14.52 | 19.50 |
| Pressure, upper bed (in. $H_2O$) | 7.59 | 7.98 | 9.45 | 15.05 |
| Fluid Bulk Density (lb/ft$^3$) | 13.17 | 14.81 | 13.17 | 11.06 |
| Prod Rate (lbs/hr) | 84 | 102 | 112 | 104 |
| First Metallocene Trim Flow, (g/hr) | 52.0 | 52.0 | 52.0 | 42.5 |
| Product Properties | | | | |

TABLE 1-continued

Examples 1-4

| | Polymerization Run | | | |
|---|---|---|---|---|
| | 1 | 2 | 3 | 4 |
| $I_5$, Melt Index (dg/min) | 0.11 | 0.12 | 0.14 | 0.12 |
| $I_{21}$, High Load Melt Index (dg/min) | 3.03 | 3.55 | 4.56 | 3.56 |
| Melt Flow Ratio ($I_{21}/I_5$) | 28.86 | 30.52 | 33.78 | 30.65 |
| Density (g/cc) | 0.9474 | 0.9478 | 0.9478 | 0.9470 |
| Plenum Gas Feed Temperature, °C. | 40.55 | 53.61 | 75.83 | 96.50 |
| Plenum Flow (lb/hr) | 2,064.0 | 2,064.7 | 2,064.0 | 2,053.5 |
| Particle Size Data | | | | |
| +#10 sieve part >2 mm | 0.1 | 0 | 0 | 0 |
| +#120/−10 sieve (0.125 to 2.0 mm) | 88.3 | 89.6 | 88 | 78.6 |
| −#120 sieve (<0.125 mm) | 11.5 | 10.4 | 12 | 21.4 |

Examples 5-6

In Examples 5-6, two separate polymerization runs were conducted at different feed temperatures. Table 2 summarizes the polymerization results for Examples 5 and 6.

TABLE 2

Example 5-6

| | Polymerization Run | |
|---|---|---|
| | 2A | 2B |
| Reactor Conditions | | |
| Residence Time (hrs) | 6.67 | 5.15 |
| $C_2$ Partial Pressure (psia) | 220 | 220 |
| $H_2/C_2$ Conc. Ratio (ppm/m %) | 20.01 | 20.01 |
| $C_6/C_2$ Conc. Ratio (m/m) | 0.0064 | 0.0064 |
| Ethylene (mol %) | 70.0 | 70.0 |
| Isopentane (mol %) | 6.9 | 6.9 |
| Nitrogen (mol %) | 22.52 | 22.55 |
| Reaction Pressure (psig) | 300.0 | 300.0 |
| Reaction Temperature (°C.) | 105.9 | 105.9 |
| Gas Velocity (ft/sec) | 1.95 | 1.95 |
| Bed Weight (lbs) | 589 | 595 |
| Bed Height (ft) | 13.68 | 15.13 |
| Pressure, upper bed (in. $H_2O$) | 6.30 | 8.93 |
| Fluid Bulk Density (lb/ft³) | 15.68 | 14.34 |
| Prod Rate (lbs/hr) | 88 | 116 |
| First Metallocene Trim Flow, (g/hr) | 0 | 0 |
| Product Properties | | |
| $I_5$, Melt Index (dg/min) | 0.05 | 0.05 |
| $I_{21}$, High Load Melt Index (dg/min) | 1.01 | 1.06 |
| Melt Flow Ratio ($I_{21}/I_5$) | 18.78 | 20.00 |
| Density (g/cc) | 0.9419 | 0.9420 |
| Plenum Gas Feed Temperature, °C. | 46.67 | 77.78 |
| Plenum Flow (lb/hr) | 2,192.5 | 2,189.1 |
| Particle Size Data | | |
| +#10 sieve (>2 mm, wt. %) | 0 | 0 |
| +#120/−10 sieve (0.125 to 2.0 mm, wt. %) | 89.9 | 90.2 |
| −#120 sieve (<0.125 mm, wt. %) | 10.1 | 9.8 |

Examples 7-9

In Examples 7-9, three separate polymerization runs were conducted at different feed temperatures. Table 3 summarizes the polymerization results for Examples 7-9.

TABLE 3

Example 7-9

| | Polymerization Run | | |
|---|---|---|---|
| | 7 | 8 | 9 |
| Reactor Conditions | | | |
| Residence Time (hrs) | 5.42 | 4.89 | 5.01 |
| $C_2$ Partial Pressure (psia) | 220 | 220 | 220 |
| $H_2/C_2$ Conc. Ratio (ppm/m %) | 20.03 | 20.02 | 20.02 |
| $C_6/C_2$ Conc. Ratio (m/m) | 0.0070 | 0.0073 | 0.0070 |
| Ethylene (mol %) | 70.1 | 70.0 | 70.0 |
| Isopentane (mol %) | 7.0 | 7.1 | 7.1 |
| Nitrogen (mol %) | 22.26 | 22.29 | 22.31 |
| Reaction Pressure (psig) | 300.0 | 300.0 | 300.0 |
| Reaction Temperature (°C.) | 105.8 | 105.9 | 105.8 |
| Gas Velocity (ft/sec) | 1.95 | 1.95 | 1.95 |
| Bed Weight (lbs) | 595 | 596 | 596 |
| Fluid Bulk Density (lb/ft³) | 15.73 | 14.49 | 12.63 |
| Bed Height (ft) | 13.76 | 15.00 | 17.14 |
| Pressure, upper bed (in. $H_2O$) | | | |
| Prod Rate (lbs/hr) | 110 | 122 | 119 |
| First Metallocene Trim Flow, (g/hr) | 44.2 | 37.2 | 36.4 |
| Product Properties | | | |
| $I_5$, Melt Index (dg/min) | 0.14 | 0.13 | 0.13 |
| $I_{21}$, High Load Melt Index (dg/min) | 4.43 | 4.36 | 4.40 |
| Melt Flow Ratio ($I_{21}/I_5$) | 32.52 | 33.60 | 34.20 |
| Density (g/cc) | 0.9468 | 0.9463 | 0.9464 |
| Plenum Gas Feed Temperature, °C. | 37.72 | 68.11 | 93.33 |
| Plenum Flow (lb/hr) | 1,996.9 | 2,062.5 | 2,065.5 |
| Particle Size Data | | | |
| +#10 sieve (>2 mm, wt. %) | 0 | 0.2 | 0.1 |
| +#120/−10 sieve (0.125 to 2.0 mm, wt. %) | 89.9 | 92.2 | 81.1 |
| −#120 sieve (<0.125 mm, wt. %) | 10 | 8.1 | 18.9 |

Examples 10-13

In Examples 10-13, three separate polymerization runs were conducted at different feed temperatures. Table 4 summarizes the polymerization results for Examples 10-12.

TABLE 4

Examples 10-12

|  | Polymerization Run | | |
| --- | --- | --- | --- |
|  | 10 | 11 | 12 |
| Reactor Conditions | | | |
| Residence Time (hrs) | 4.56 | 4.93 | 5.09 |
| $C_2$ Partial Pressure (psia) | 221 | 220 | 220 |
| $H_2/C_2$ Conc. Ratio (ppm/m %) | 20.01 | 20.03 | 20.11 |
| $C_6/C_2$ Conc. Ratio (m/m) | 0.0056 | 0.0052 | 0.0052 |
| Ethylene (mol %) | 70.1 | 70.0 | 69.9 |
| Isopentane (mol %) | 6.8 | 6.8 | 6.8 |
| Nitrogen (mol %) | 22.54 | 22.68 | 22.79 |
| Reaction Pressure (psig) | 300.0 | 300.0 | 300.0 |
| Reaction Temperature (° C.) | 105.9 | 105.9 | 105.9 |
| Gas Velocity (ft/sec) | 1.95 | 1.95 | 1.95 |
| Bed Weight (lbs) | 591 | 590 | 595 |
| Bed Height (ft) | 13.25 | 14.70 | 16.84 |
| Pressure, upper bed (in. $H_2O$) | 5.39 | 6.51 | 9.20 |
| Fluid Bulk Density (lb/ft$^3$) | 16.18 | 14.61 | 12.79 |
| Prod Rate (lbs/hr) | 130 | 120 | 117 |
| First Metallocene Trim Flow, (g/hr) | 59.8 | 54.6 | 50.3 |
| Product Properties | | | |
| $I_5$, Melt Index (dg/min) | 0.11 | 0.11 | 0.11 |
| $I_{21}$, High Load Melt Index (dg/min) | 3.72 | 3.91 | 3.78 |
| Melt Flow Ratio ($I_{21}/I_5$) | 32.86 | 34.13 | 34.97 |
| Density (g/cc) | 0.9468 | 0.9466 | 0.9464 |
| Plenum Gas Feed Temperature, ° C. | 39.39 | 71.22 | 93.33 |
| Plenum Flow (lb/hr) | 2,028.2 | 2,027.8 | 2,059.8 |
| Particle Size Data | | | |
| +#10 sieve (>2 mm, wt. %) | 0 | 0 | 0 |
| +#120/−10 sieve (0.125 to 2.0 mm, wt. %) | 90.9 | 88.4 | |
| −#120 sieve (<0.125 mm, wt. %) | 9.1 | 11.6 | 16.8 |

Figure 2:
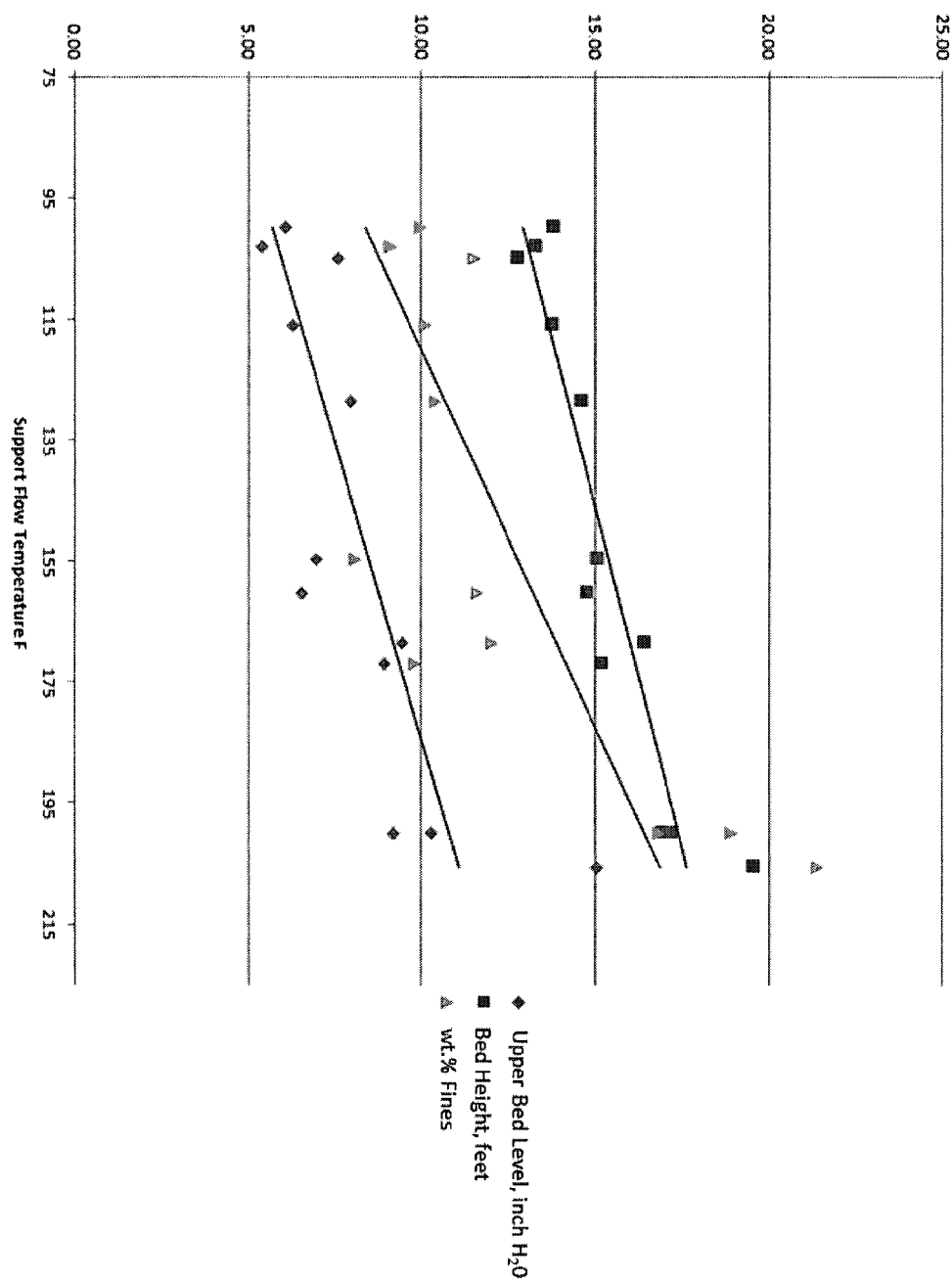
FIG. 2 depicts a graphical representation of the polymer fines, bed height and bed pressure versus temperature of a feed introduced to the catalyst injection nozzle for Examples 1-12.

As shown in Tables 1-4 and in the graph depicted in FIG. 2, surprisingly and unexpectedly the amount of fines in Examples 1-12 generally increases with increasing plenum temperature. This is corroborated by increase in both the bed height and the pressure at the top of the reactor as shown in FIG. 2. The upper bed pressure (in $H_2O$) in FIG. 2 is a pressure reading from a level tap that is located near the upper section of the reactor bed and provides a value that is related to the height of the polymer above the neck. Accordingly, from the data shown in Tables 1-4 and the Graph in FIG. 2, increasing the temperature of the feed substantially increases the amount of fines.

Example 14

Figure 3:
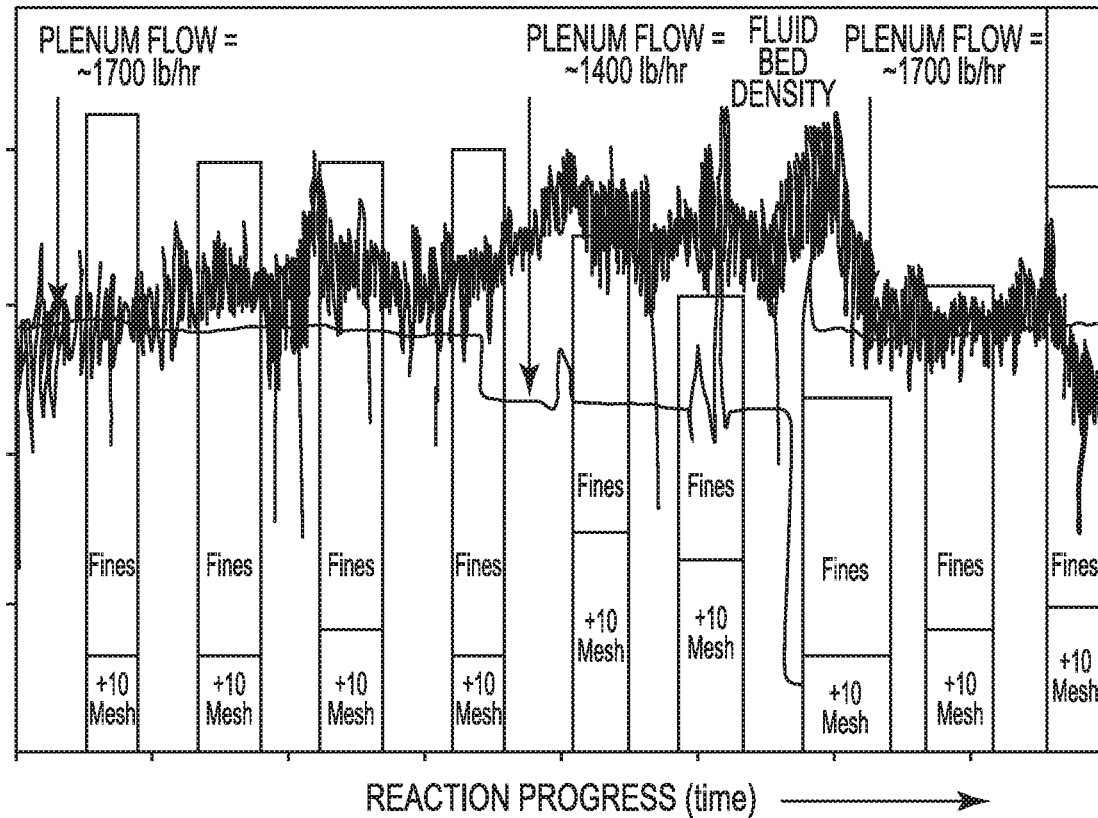
FIG. 3 depicts a graphical representation of the flow rate, polymer morphology, and bed density during a portion of an exemplary process of Example 13.

Example 1 was substantially repeated except that the plenum flow rate of feed was initially set at a first flow rate of about 1700 lbs/hr (about 771 kg/hr). The amount of fines and the amount of +10 mesh (US) particles and the fluid bed density were measured over the course of the process. The plenum flow was reduced to a second flow rate of about 1400 lbs/hr (635 kg/hr). The amount of fines, +10 mesh US particles, and the fluid bed density were determined. As FIG. 3 shows, the plenum flow rate of about 1700 lbs/hr (771 kg/hr) established a bed having about 12 wt. % fines and about 0.5 wt. %+10 mesh US particles. The fluid bed density was about 0.21 gm/cm$^3$. When the plenum flow was reduced to about 1400 lbs/hr (about 635 kg/hr), the amount of fines decreased to < about 10 wt. % and while the amount of +10 mesh particles increased to about 1 wt. %. The fluid bed density increased slightly to > about 0.22 gm/cm$^3$. The plenum flow was increased back to about 1700 lb/hr (about 771 kg/hr), and the amount of fines increased and the amount of +10 mesh particles decreased. The changes in flow rate, particle morphology, and fluid bed density are illustrated in FIG. 3.

Thus, particularly where polymer particles form by a mechanism other than replication of a support, particle size distribution may be surprisingly affected by the manner in which the feed and catalyst are supplied to the reactor, particularly in the short time period during which the particles exit the injection nozzle and enter the reactor.

PARTICULAR EMBODIMENTS

Embodiment 1

A method for controlling polymer morphology in olefin polymerization, comprising flowing a catalyst through a first concentric flow path of an injection nozzle having two or more concentric flow paths and into a fluidized bed disposed within a reactor; flowing a feed comprising one or more monomers, one or more inert fluids, or a combination thereof through a second concentric flow path of the injection nozzle and into the fluidized bed, and controlling one or more of: i) the temperature of the second concentric flow path or ii) the flow rate of the feed through the second concentric flow path; and contacting one or more olefins with the catalyst within the fluidized bed at conditions sufficient to produce a polyolefin.

Embodiment 2

A method for controlling polymer morphology in olefin polymerization, comprising flowing a catalyst through a first concentric flow path of an injection nozzle having two or more concentric flow paths and into a fluidized bed disposed within a reactor; flowing a first amount of feed comprising one or more olefins, one or more inert fluids, or a combination thereof through a second concentric flow path of the injection nozzle at first flow rate and first temperature and into the fluidized bed; and contacting the first amount of feed with the catalyst within the fluidized bed at conditions sufficient to produce a polyolefin having a first size distribution; flowing a second amount of the catalyst through the first concentric flow path and into the fluidized bed; flowing a second amount of feed comprising one or more olefins, one or more inert fluids, or a combination thereof through the second concentric flow path at a second flow rate and a second temperature and into the fluidized bed; and contacting the second amount of feed with the catalyst within the fluidized bed at conditions sufficient to produce a polyolefin having a second size distribution, wherein the first size distribution is different from the second size distribution, wherein the first temperature is different from the second temperature and/or the first flow rate is different from the second flow rate.

Embodiment 3

The method of any of Embodiments 1 to 3, wherein the feed is at a temperature of about 35° C. to about 110° C., e.g., about 70° C. to about 100° C., or about 93° C. to about 110° C.

Embodiment 4

The method of any of Embodiments 1 to 3, wherein the feed is at a temperature within about 140° C. of the temperature of the fluidized bed.

Embodiment 5

The method of any of Embodiments 1 to 4, wherein flowing the feed through the second concentric flow path and into the fluidized bed increases an amount of fines in the fluidized bed by at least 5 wt. % as compared to flowing the feed through the second concentric flow path and into the fluidized bed when the feed is at a temperature below ambient temperature.

Embodiment 6

The method of any of Embodiments 1 to 6, wherein the flow rate of the feed is about 455 to about 2268 kg/hr, e.g., about 680 to about 2041 kg/hr, 907 to about 1814 kg/hr), about 1134 to about 1588 kg/hr), or about 1361 kg/hr).

Embodiment 7

The method of any of Embodiments 1 to 7, wherein the one or more olefins comprise ethylene.

Embodiment 8

The method of any of Embodiments 1 to 8, wherein the feed comprises ethylene.

Embodiment 9

The method of any of Embodiments 1 to 9, wherein the feed comprises a recycle fluid recovered from the reactor.

Embodiment 10

The method of any of Embodiments 1 to 10, wherein the feed comprises the one or more monomers, and wherein an amount of the one or more monomers introduced to the reactor by flowing the feed through the second concentric flow path comprises less than about 30 wt. % of the amount of the olefins consumed within the reactor.

Embodiment 11

The method of any of Embodiments 1 to 11, wherein the second flow path is at least partially disposed about the first flow path.

Embodiment 12

The method of any of Embodiments 1 to 12, wherein the catalyst and the feed contact one another within the nozzle.

Embodiment 13

The method of any of Embodiments 1 to 13, wherein the catalyst and the feed flow through the nozzle without contacting one another, and wherein upon exiting the nozzle the catalyst and the feed contact one another within the fluidized bed.

Embodiment 14

The method of any of Embodiments 1 to 14, wherein the catalyst comprises one or more Ziegler-Natta catalysts, one or more chromium-based catalysts, one or more metallocene catalysts, one or more bimetallic catalysts, or any combination thereof.

Embodiment 15

The method of any of Embodiments 1 to 15, wherein the catalyst comprises at least one metallocene catalyst and at least one non-metallocene catalyst.

Embodiment 16

The method of claim 1 or 2, wherein the catalyst comprises at least one metallocene catalyst and at least one Group 15-containing catalyst.

Embodiment 17

The method of any of Embodiments 1 to 17, wherein the catalyst comprises at least one metallocene catalyst and at least one Group 15-containing catalyst, wherein the Group 15-containing catalyst compound, is selected from those having the following structures:

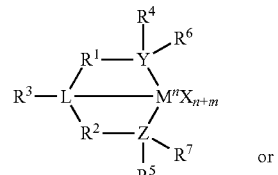

Formula I

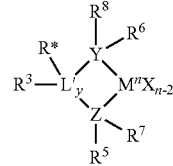

Formula II wherein M is a Group 3 to 12 transition metal or a Group 13 or 14 main group metal; each X is independently an anionic leaving group; y is 0 or 1; n is the oxidation state of M; m is the formal charge of the ligand represented by YZL or YZL'; L is a Group 15 or 16 element; L' is a Group 15 or 16 element or Group 14 containing group; Y is a Group 15 element; Z is a Group 15 element; $R^1$ and $R^2$ are independently a $C_1$ to $C_{20}$ hydrocarbon group, a heteroatom containing group having up to twenty carbon atoms, silicon, germanium, tin, lead, or phosphorus; $R^1$ and $R^2$ may also be interconnected to each other; $R^3$ is absent, a hydrocarbon group, hydrogen, a halogen, or a heteroatom containing group; $R^4$ and $R^5$ are independently an alkyl group, an aryl group, a substituted aryl group, a cyclic alkyl group, a substituted cyclic alkyl group, a cyclic aralkyl group, a substituted cyclic aralkyl group or a multiple ring system; $R^4$ and $R^5$ may be interconnected to each other; $R^6$ and $R^7$ are independently absent, hydrogen, an alkyl group, halogen, heteroatom, or a hydrocarbyl group; and R* is absent, hydrogen, a Group 14 atom containing group, a halogen, or a heteroatom containing group.

The method of claim 18 wherein the metallocene catalyst is selected from bis(n-propyl cyclopentadienyl) $MX_2$, (tetramethylcyclopentadienyl)(n-propylcyclopentadienyl) $MX_2$, bis(indenyl) $MX_2$, and (tetramethylcyclopentadienyl)(n-propylcyclopentadienyl) $MX_2$, wherein M is a Group 4 metal, and X is an anionic leaving group.

Embodiment 18

The method of any of Embodiments 1 to 18, wherein the catalyst comprises a slurry of catalyst particles in an inert liquid.

Embodiment 19

The method of any of Embodiments 1 to 18, wherein the catalyst comprises a solution of catalyst in an inert liquid.

Embodiment 20

The method of any of Embodiments 2 to 20, wherein the first temperature is about −35° C. to about 110° C. and the second temperature is about −35° C. to about 110° C.

Embodiment 21

The method of any of Embodiments 2 to 21, wherein the first flow rate is about 455 to about 2268 kg/hr and the second flow rate is about 455 to about 2268 kg/hr.

All numerical values are "about" or "approximately" the indicated value, and take into account experimental error and variations that would be expected by a person having ordinary skill in the art. Likewise, the skilled person will understand that the values discussed herein refer generally to normal, steady state operations and that the concepts described herein can be applied to start-up and upset-type conditions. Thus, the claims should be interpreted to cover any process that operates in the claimed region under steady state conditions. Operation of the process for a time period during start-up, upset, or the re-establishment of steady state conditions outside the claimed ranges should not preclude infringement where the parameters are met during normal, steady-state operation.

While the foregoing is directed to embodiments of the present invention, other and further embodiments of the invention can be devised without departing from the basic scope thereof, and the scope thereof is determined by the claims that follow.

What is claimed is:

1. A method for controlling polymer particle morphology in olefin polymerization, comprising:
    flowing a catalyst through a first concentric flow path of an injection nozzle having two or more concentric flow paths and into a fluidized bed disposed within a reactor;
    flowing a feed comprising one or more monomers, one or more inert fluids, or a combination thereof through a second concentric flow path of the injection nozzle and into the fluidized bed;
    contacting one or more monomers with the catalyst within the fluidized bed at conditions sufficient to produce a polyolefin;
    determining a polymer particle morphology for the polyolefin, wherein the polymer particle morphology includes fines;
    controlling an amount of the fines in the polymer particle morphology through a change to one or more of:
        i) a temperature of the second concentric flow path or
        ii) a flow rate of the feed through the second concentric flow path, wherein controlling the amount of fines by increasing one or more of the temperature and the flow rate increases the amount of fines produced by 1 percent (%) to about 200%, and wherein controlling the amount of fines by decreasing one or more of the temperature and the flow rate decreases the amount of fines produced by 2% to about 75%; and
    contacting one or more monomers with the catalyst within the fluidized bed at conditions sufficient to produce a polyolefin having a controlled amount of fines.

2. The method of claim 1, wherein the feed is at a temperature of about −35° C. to about 110° C.

3. The method of claim 1, wherein the feed is at a temperature of about 70° C. to about 100° C.

4. The method of claim 1, wherein the feed is at a temperature of about 93° C. to about 110° C.

5. The method of claim 1, wherein the feed is at a temperature within about 140° C. of the temperature of the fluidized bed.

6. The method of claim 1, wherein flowing the feed through the second concentric flow path and into the fluidized bed increases the amount of fines within the fluidized bed by at least 5 wt. % as compared to flowing the feed through the second concentric flow path and into the fluidized bed when the feed is at a temperature below ambient temperature.

7. The method of claim 1, wherein controlling the flow rate includes controlling the flow rate in a range of about 455 to about 2268 kg/hr.

8. The method of claim 1, wherein the one or more monomers comprise ethylene.

9. The method of claim 1, wherein the feed comprises ethylene.

10. The method of claim 1, wherein the feed comprises a recycle fluid recovered from the reactor.

11. The method of claim 1, wherein the feed comprises the one or more monomers, and wherein an amount of the one or more monomers introduced to the reactor by flowing the feed through the second concentric flow path comprises less than about 30 wt % of the amount of the olefins consumed within the reactor.

12. The method of claim 1, wherein the second flow path is at least partially disposed about the first flow path.

13. The method of claim 1, wherein the catalyst and the feed contact one another within the nozzle.

14. The method of claim 1, wherein the catalyst and the feed flow through the nozzle without contacting one another, and wherein upon exiting the nozzle the catalyst and the feed contact one another within the fluidized bed.

15. The method of claim 1, wherein the catalyst comprises one or more Ziegler-Natta catalysts, one or more chromium-based catalysts, one or more metallocene catalysts, one or more bimetallic catalysts, or any combination thereof.

16. The method of claim 1, wherein the catalyst comprises at least one metallocene catalyst and at least one non-metallocene catalyst.

17. The method of claim 1, wherein the catalyst comprises at least one metallocene catalyst and at least one Group 15-containing catalyst.

18. The method of claim 17, wherein the Group 15-containing catalyst compound, is selected from those having the following structures:

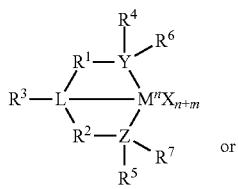

Formula I

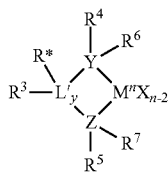

Formula II wherein
M is a Group 3 to 12 transition metal or a Group 13 or 14 main group metal;
each X is independently an anionic leaving group;
y is 0 or 1;
n is the oxidation state of M;
m is the formal charge of the ligand represented by YZL or YZL';
L is a Group 15 or 16 element;
L' is a Group 15 or 16 element or Group 14 containing group;
Y is a Group 15 element;
Z is a Group 15 element;
$R^1$ and $R^2$ are independently a $C_1$ to $C_{20}$ hydrocarbon group, a heteroatom containing group having up to twenty carbon atoms, silicon, germanium, tin, lead, or phosphorus;
$R^1$ and $R^2$ may also be interconnected to each other;
$R^3$ is absent, a hydrocarbon group, hydrogen, a halogen, or a heteroatom containing group;
$R^4$ and $R^5$ are independently an alkyl group, an aryl group, a substituted aryl group, a cyclic alkyl group, a substituted cyclic alkyl group, a cyclic aralkyl group, a substituted cyclic aralkyl group or a multiple ring system;
$R^4$ and $R^5$ may be interconnected to each other;
$R^6$ and $R^7$ are independently absent, hydrogen, an alkyl group, halogen, heteroatom, or a hydrocarbyl group; and
$R^*$ is absent, hydrogen, a Group 14 atom containing group, a halogen, or a heteroatom containing group.

19. The method of claim 17 wherein the metallocene catalyst is selected from bis(n-propyl cyclopentadienyl) $MX_2$, (pentamethylcyclopentadienyl)(n-propyl cyclopentadienyl)$MX_2$, bis(indenyl)$MX_2$, and (tetramethylcyclopentadienyl) (n-propylcyclopentadienyl) $MX_2$, wherein M is a Group 4 metal, and X is an anionic leaving group.

20. The method of claim 1, wherein the catalyst is a slurry of solid catalyst particles in an inert liquid.

* * * * *